(12) United States Patent
Takashima

(10) Patent No.: US 8,037,099 B2
(45) Date of Patent: Oct. 11, 2011

(54) INFORMATION-RECORDING/ REPRODUCTION APPARATUS, INFORMATION-RECORDING/ REPRODUCTION METHODS, PROGRAM-STORING MEDIUM AND PROGRAMS

(75) Inventor: Yoshikazu Takashima, Tokyo (JP)

(73) Assignee: Sony Corporation, Tokyo (JP)

(*) Notice: Subject to any disclaimer, the term of this patent is extended or adjusted under 35 U.S.C. 154(b) by 814 days.

(21) Appl. No.: 10/990,020

(22) Filed: Nov. 16, 2004

(65) Prior Publication Data

US 2005/0105430 A1 May 19, 2005

(30) Foreign Application Priority Data

Nov. 17, 2003 (JP) ................ P2003-386787

(51) Int. Cl.
*G06F 7/00* (2006.01)
*G06F 17/30* (2006.01)
*G06F 12/00* (2006.01)
(52) U.S. Cl. .............................. 707/796; 707/828
(58) Field of Classification Search .................. 707/737, 707/828, 822, 796, 791
See application file for complete search history.

(56) References Cited

U.S. PATENT DOCUMENTS

| | | | | |
|---|---|---|---|---|
| 6,424,607 | B2* | 7/2002 | Fujinami et al. | 369/47.28 |
| 6,573,819 | B1* | 6/2003 | Oshima et al. | 386/111 |
| 6,775,803 | B1* | 8/2004 | Chung et al. | 714/763 |
| 2003/0108335 | A1* | 6/2003 | Nakamura et al. | 386/95 |
| 2003/0163449 | A1* | 8/2003 | Iwano et al. | 707/1 |
| 2004/0078383 | A1* | 4/2004 | Mercer et al. | 707/102 |
| 2005/0071551 | A1* | 3/2005 | Miyamoto | 711/113 |
| 2005/0102186 | A1* | 5/2005 | Buil | 705/26 |
| 2005/0105888 | A1* | 5/2005 | Hamada et al. | 386/95 |
| 2006/0120224 | A1* | 6/2006 | Nakamura et al. | 369/30.3 |

FOREIGN PATENT DOCUMENTS

| | | |
|---|---|---|
| JP | 8-147702 | 6/1996 |
| JP | 2002-329385 | 11/2002 |
| WO | WO 02095611 A2 * | 11/2002 |

OTHER PUBLICATIONS

ECMA, DVD Read-Only Disk File System Specifications, ECMA Technical Reprot TR/71, Feb. 1998, pp. 1-80.*
ECMA, DVD Read-Only Disk File System Specifications, ECMA Technical Report TR/71, Feb. 1998, pp. 1-80.*
U.S. Appl. No. 12/713,281, filed Feb. 26, 2010, Takashima, et al.

* cited by examiner

*Primary Examiner* — Kuen Lu
*Assistant Examiner* — Hexing Liu
(74) *Attorney, Agent, or Firm* — Oblon, Spivak, McClelland, Maier & Neustadt, L.L.P.

(57) ABSTRACT

An MIA containing file-system information is updated and a recording/reproduction block 53 records Main MIA containing the updated information in block B"1 in a free area on a recording medium. In addition, Main G1, Res.G1, Main G2, Res.G2 and G3, which form a group of files each serving as an object of group management, are recorded in block B"2. Furthermore, Res.MIA containing a backup of the file-system information is recorded in block B"3. By recording information in this way, the recording area of the recording medium can be used effectively. The present invention can be applied to an information-recording/reproduction apparatus for recording information serving as an object of the group management on the recording medium.

11 Claims, 29 Drawing Sheets

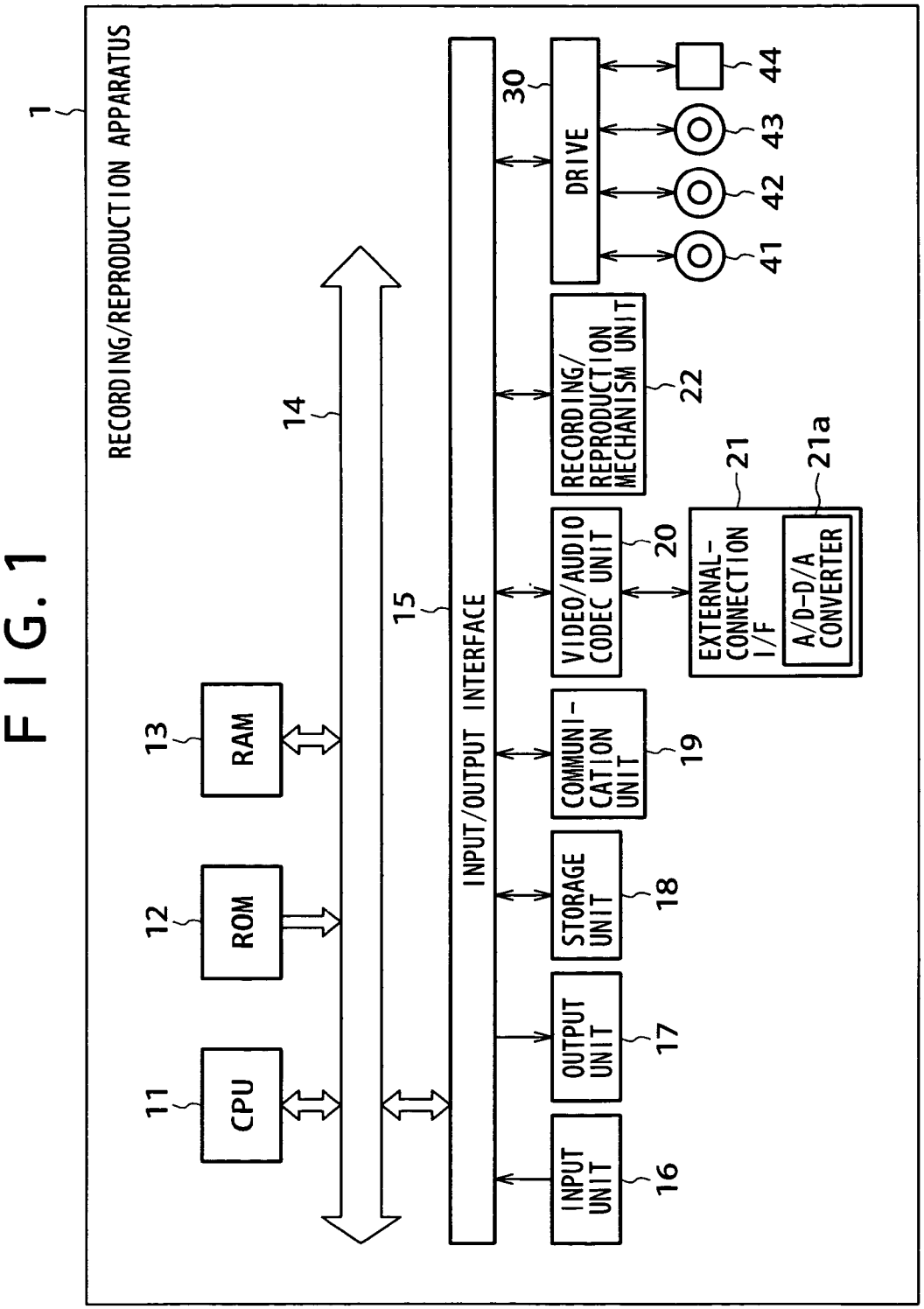

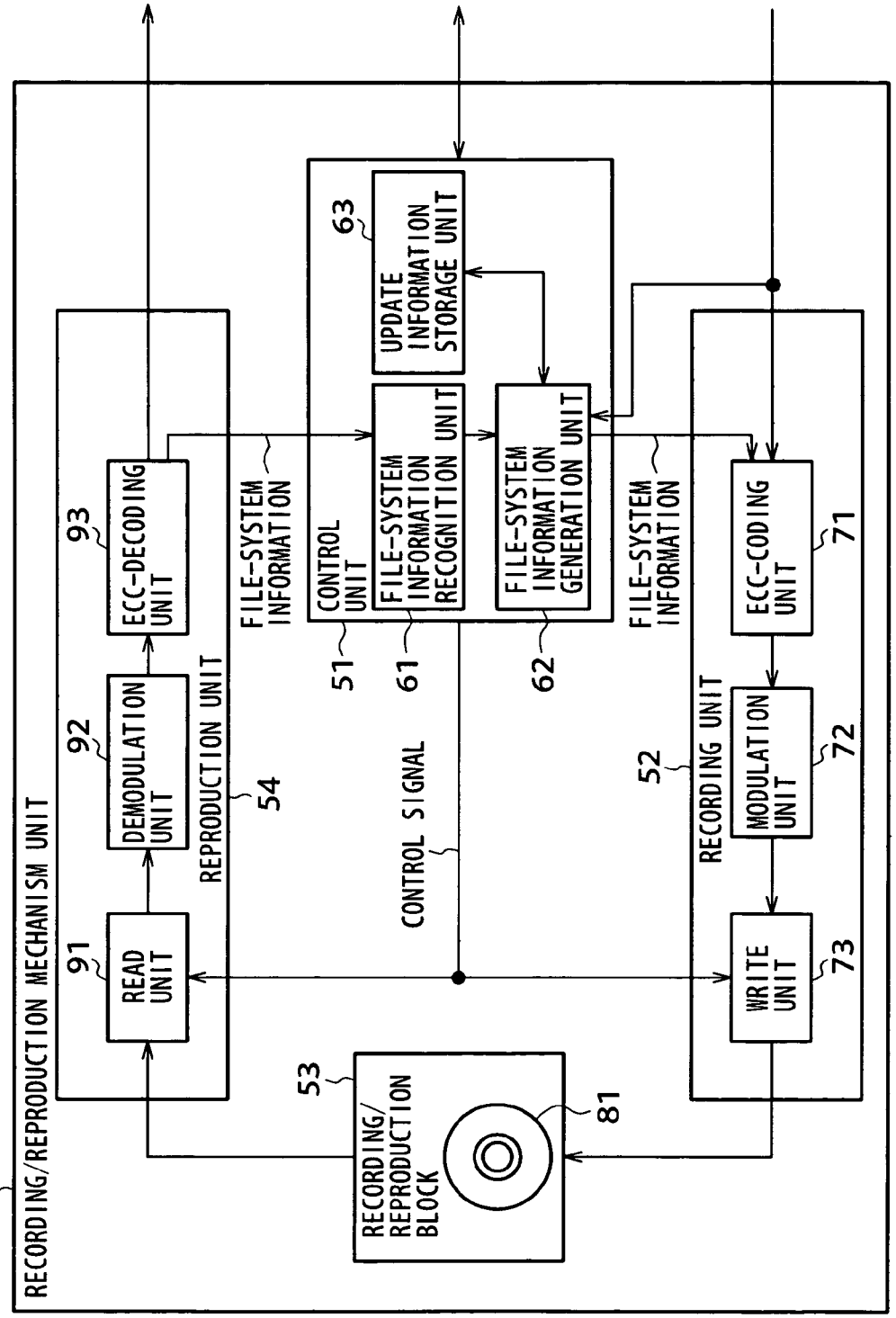

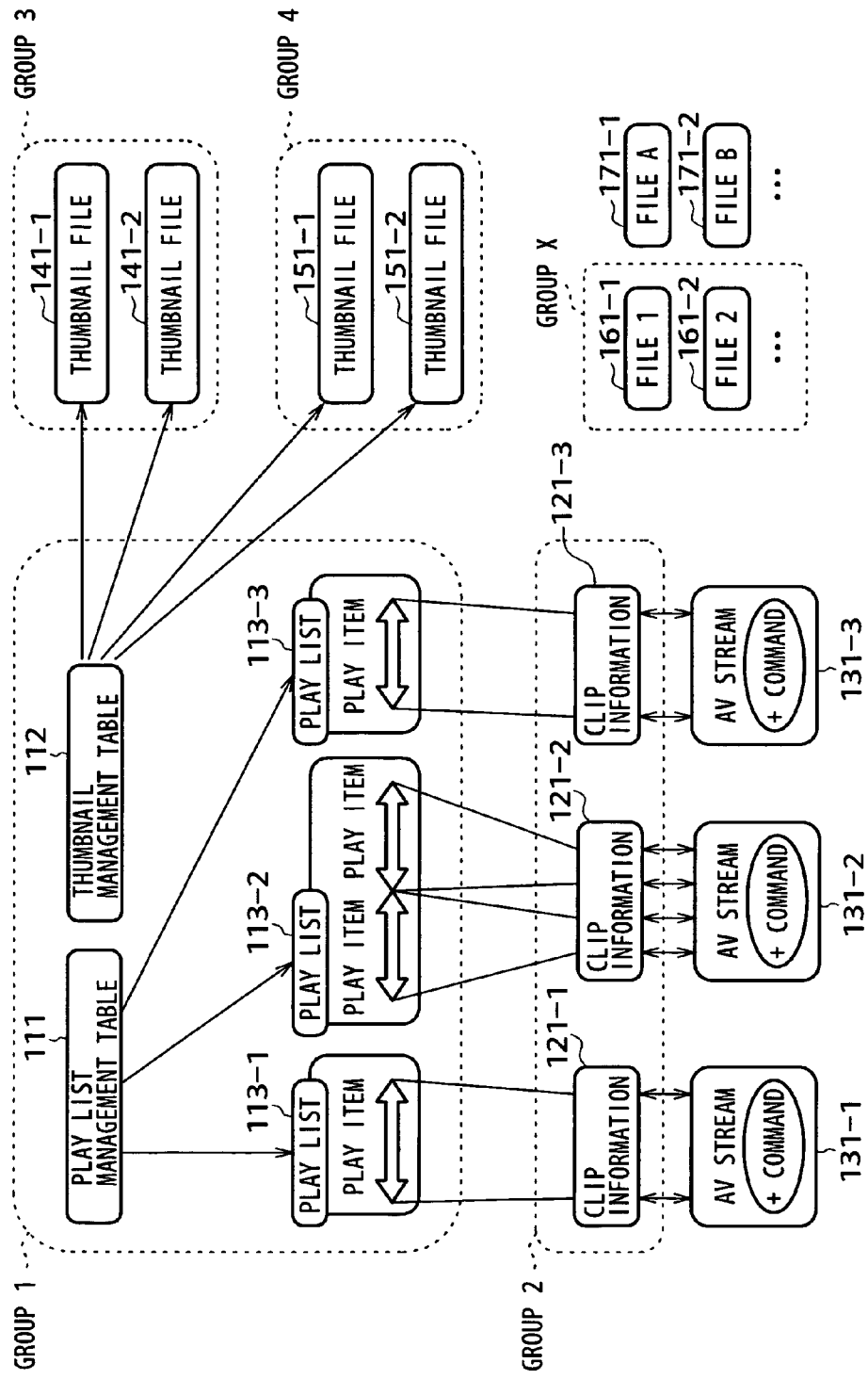

FIG. 8

<Allocation Rule Set Table>

| [GROUPS] | [START ADDRESS] | [END ADDRESS] |
|---|---|---|
| Main G1 | $S_{MG1}$ | $E_{MG1}$ |
| Reserved G1 | $S_{RG1}$ | $E_{RG1}$ |
| Main G2 | $S_{MG2}$ | $E_{MG2}$ |
| Reserved G2 | $S_{RG2}$ | $E_{RG2}$ |
| G3 | $S_{G3}$ | $E_{G3}$ |
| G4 | $S_{G4}$ | $E_{G4}$ |

FIG. 9

| TYPICAL USER OPERATIONS | MIA | G1 | G2 | G3 | G4 | AV-Stream | NON-APPLICATION-SPECIFIC FILES |
|---|---|---|---|---|---|---|---|
| [SPECIFIC APPLICATION OPERATION] | | | | | | | |
| PLAY-LIST CREATION | O | O | O | — | — | O | — |
| PLAY-LIST DIVISION | O | O | — | — | — | — | — |
| PLAY-LIST CONCATENATION | O | O | — | — | — | — | — |
| PLAY-LIST COMPLETE DELETION | O | O | — | — | — | — | — |
| PLAY-LIST PARTIAL DELETION | O | O | — | — | — | — | — |
| VIRTUAL PLAY-LIST-EDITING OPERATION USING NO BRIDGE | O | O | O | — | — | — | — |
| VIRTUAL PLAY-LIST-EDITING OPERATION USING A BRIDGE | O | O | — | — | — | O | — |
| VIRTUAL PLAY-LIST DELETION | O | O | — | — | — | — | — |
| AFTER-RECORDING SOUND SET OPERATION | O | O | — | — | — | — | — |
| PLAY-LIST DISPLAY-ORDER MODIFICATION | O | O | — | — | — | — | — |
| MENU THUMBNAIL ADDITION | O | O | — | — | — | — | — |
| MARK THUMBNAIL ADDITION | O | O | — | — | — | — | — |
| [OPERATIONS OTHER THAN SPECIFIC APPLICATION OPERATIONS] | | | | | | | |
| ADDITION OF A FILE NOT CONFORMING TO BDAV SPECIFICATIONS (SUCH AS A JPEG PICTURE) | O | — | — | — | — | — | O |
| DELETION OF A FILE NOT CONFORMING TO BDAV SPECIFICATIONS | O | — | — | — | — | — | — |

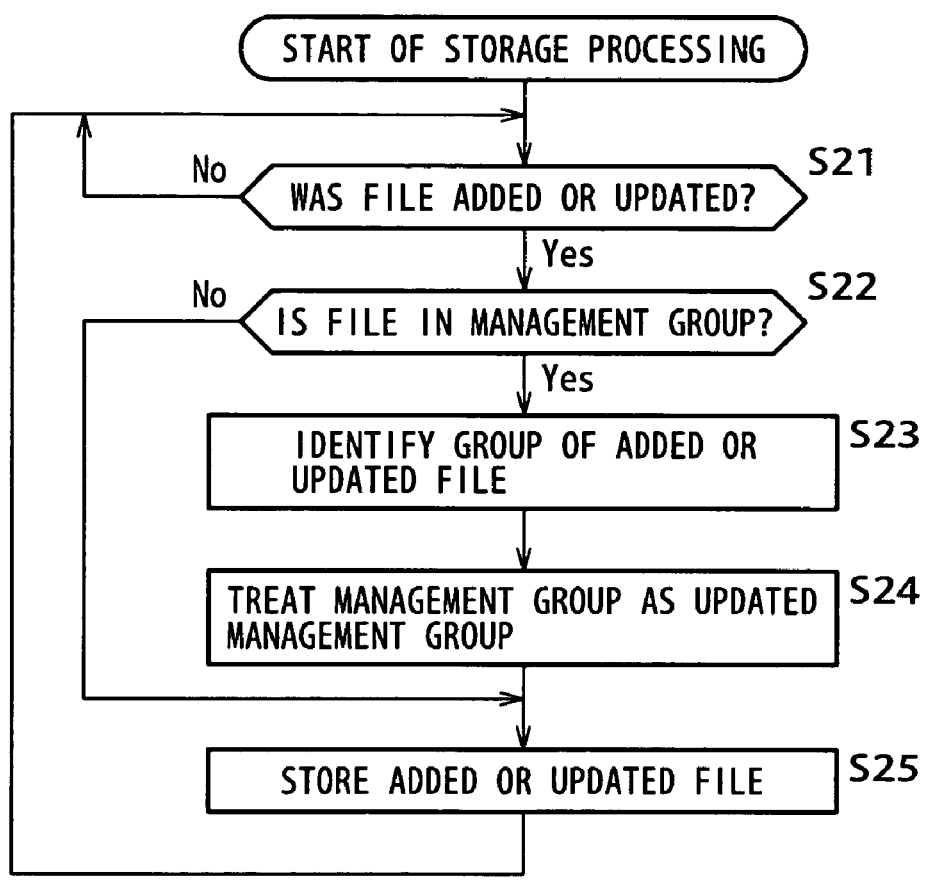
F I G. 1 4

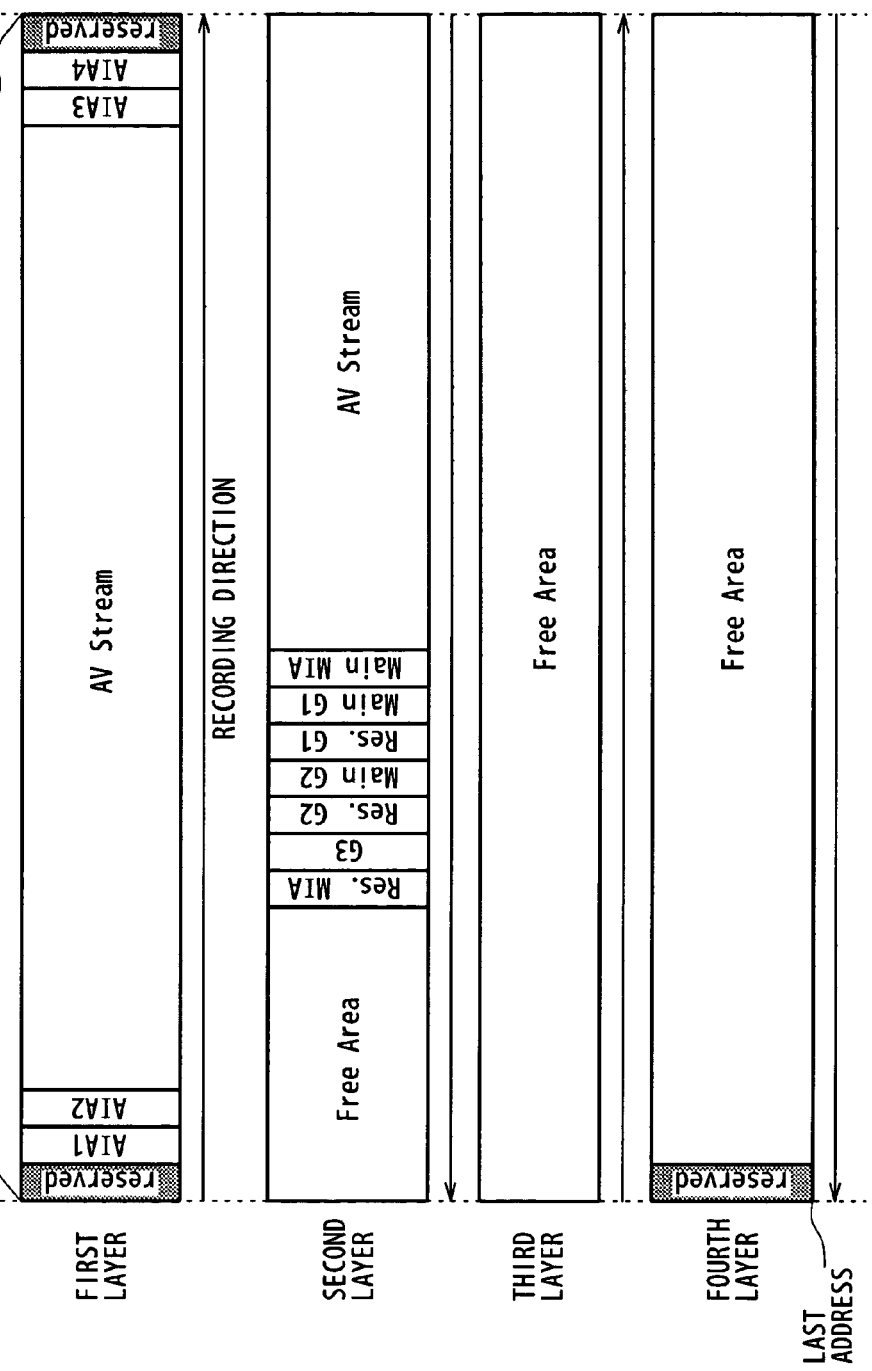

INFORMATION-RECORDING/REPRODUCTION APPARATUS, INFORMATION-RECORDING/REPRODUCTION METHODS, PROGRAM-STORING MEDIUM AND PROGRAMS

BACKGROUND OF THE INVENTION

The present invention relates to an information-recording/reproduction apparatus, an information-recording/reproduction method adopted by the information-recording/reproduction apparatus, a program implementing the information-recording/reproduction method and a program-storing medium for storing the program.

A technology for recording files onto a recording medium having a large recording capacity has been becoming popular.

In the mean time, a variety of formats has been proposed as formats in which files are to be recorded onto the recording medium having a large recording capacity.

An example of the formats is a UDF (Universal Disc Format) used in a DVD (Digital Versatile Disc). For more information on this format, refer to non-patent reference 1: Universal Disk Format Specification, Revision 2.01, Mar. 15, 2000, Optical Storage Technology Association The UDF cited above provides a structure in which a large number of files may be recorded on a recording medium at scattered locations. In addition, pieces of information indicating locations of the files are stored in a nesting state. Thus, in order to eventually acquire a desired file, accesses to a large number of addresses must be made. Therefore, in an operation to reproduce information such as a moving picture from a recording medium in such a recording state, it is feared that correct reproduction timings can no longer be assured. As a result, the UDF raises a problem that the moving picture cannot be reproduced smoothly.

In addition, if a file is updated or added with a large number of files already recorded at scattered locations on a recording medium, for example, the locations of the files get more scattered. Thus, in order to acquire a desired file, accesses to a large number of addresses must be made. As a result, the UDF raises a problem that correct reproduction timings can no longer be assured and the recording area of the recording medium can no longer be used with a high degree of efficiency.

On top of that, if the recording medium has a defective sector or the like existing in an area for recording file-system information or other data, the information on the recording medium can no longer be recovered due to the fact that a large number of files are recorded at scattered locations. Thus, it is feared that the use of a large-capacity recording medium itself entails a big risk.

SUMMARY OF THE INVENTION

It is thus an object of the present invention addressing the problems described above to execute group management on files that must be read out particularly at a high speed so as to increase a file-reading speed, assure sufficiently short time required for reproduction, use the recording area of the recording medium with a high degree of efficiency even if the group management is executed on the files and acquire latest possible file-system information or the like for a recovery purpose in case the latest file-system information or the like cannot be read out from the recording medium.

An information-recording/reproduction apparatus provided by the present invention is characterized in that the information-recording/reproduction apparatus includes:

a recording unit for recording a file onto a recording medium; and a control unit for controlling the recording unit to group files on the basis of attribute information and record the files in group units onto the recording medium wherein the attribute information includes the use frequency of each file, the size of each file and data indicating whether or not each file is used in a specific application program.

It is possible to implement the information-recording/reproduction apparatus with a configuration in which the control unit recognizes an allocation class of a file as the attribute information of the file, controls the recording unit to group files on the basis of allocation classes of the files and record the files onto the recording medium in group units.

It is possible to implement the information-recording/reproduction apparatus with a configuration in which, when a file is added or updated, the control unit controls the recording unit to newly record specific files recorded on the recording medium in group units collectively in another area on the recording medium where the specific files are all files pertaining to a group including the added or updated file.

It is possible to implement the information-recording/reproduction apparatus with a configuration in which, when a file is added or updated, the control unit controls the recording unit to newly record specific files recorded on the recording medium in group units collectively in another area on the recording medium where the specific files are all files pertaining to a plurality of groups including a group including the added or updated file.

It is possible to implement the information-recording/reproduction apparatus with a configuration in which, when file-system information of the recording medium is changed, the control unit controls the recording unit to newly record specific files recorded on the recording medium in group units and the file-system information collectively in another area on the recording medium where the specific files are all files pertaining to at least a group.

It is possible to implement the information-recording/reproduction apparatus with a configuration, which further includes a read unit for reading out file-system information recorded on the recording medium in group units from the recording medium wherein, when an operation to read out re-recorded file-system information ends in a failure, the read unit reads out other file-system information corresponding to the unreadable file-system information from an area for storing the other file-system information before being re-recorded as the unreadable file-system information.

It is possible to implement the information-recording/reproduction apparatus with a configuration in which, when a file is added or updated, after a predetermined command is issued, the control unit controls the recording unit to newly record specific files recorded on the recording medium in group units collectively in another area on the recording medium where the specific files are all files pertaining to a group including the added or updated file.

It is possible to implement the information-recording/reproduction apparatus with a configuration in which the control unit controls the recording unit to group files on the basis of attribute information and record the files in group units collectively in a contiguous area of the recording medium where the attribute information includes the use frequency of each file, the size of each file and data indicating whether or not each file is used in a specific application program.

An information-recording/reproduction method provided by the present invention is characterized in that the information-recording/reproduction method includes:

a recording step of recording a file onto a recording medium; and a control step of controlling processing carried out at the recording step to group files on the basis of attribute information and record the files in group units onto the recording medium wherein the attribute information includes the use frequency of each file, the size of each file and data indicating whether or not each file is used in a specific application program.

A recording medium provided by the present invention as a recording medium for recording a program is characterized in that the program includes the step of executing control to group files on the basis of attribute information and record the files in group units onto a recording medium wherein the attribute information includes the use frequency of each file, the size of each file and data indicating whether or not each file is used in a specific application program.

A program provided by the present invention as a program to be executed by a computer is characterized in that the program drives the computer to carry out processing including the step of executing control to group files on the basis of attribute information and record the files in group units onto a recording medium wherein the attribute information includes the use frequency of each file, the size of each file and data indicating whether or not each file is used in a specific application program.

In the information-recording/reproduction apparatus provided by the present invention, the information-recording/reproduction method adopted by the information-recording/reproduction apparatus and the program implementing the information-recording/reproduction method, files are grouped on the basis of attribute information and recorded in group units onto a recording medium wherein the attribute information includes the use frequency of each file, the size of each file and data indicating whether or not each file is used in a specific application program.

The information-recording/reproduction apparatus provided by the present invention can be an independent apparatus or a block for carrying out an information-recording/reproduction process.

In accordance with the present invention, files recorded on a recording medium as files each serving as an object of group management can be read out from the recording medium at a high speed, the recording area of the recording medium can be used with a high degree of efficiency and latest possible file-system information or the like can be acquired for a recovery purpose in case the latest file-system information or the like cannot be read out from the recording medium.

BRIEF DESCRIPTION OF THE DRAWINGS

FIG. 1 is a diagram showing the configuration of an embodiment implementing a recording/reproduction apparatus provided by the present invention;

FIG. 2 is a diagram showing a configuration of a recording/reproduction mechanism unit employed in the recording/reproduction apparatus shown in FIG. 1;

FIG. 3 is a diagram showing an example of group management;

FIG. 8 is a diagram showing file-system information;

FIG. 9 is a diagram showing whether or not changes result from a variety of operations carried out on files each serving as an object of the group management;

FIG. 14 shows a flowchart representing a process carried out by the recording/reproduction mechanism unit shown in FIG. 13 to store data;

FIG. 29 is an explanatory diagram showing a typical layout of data recorded on a recording medium having a number of recording layers.

DESCRIPTION OF THE PREFERRED EMBODIMENTS

Figure 4:
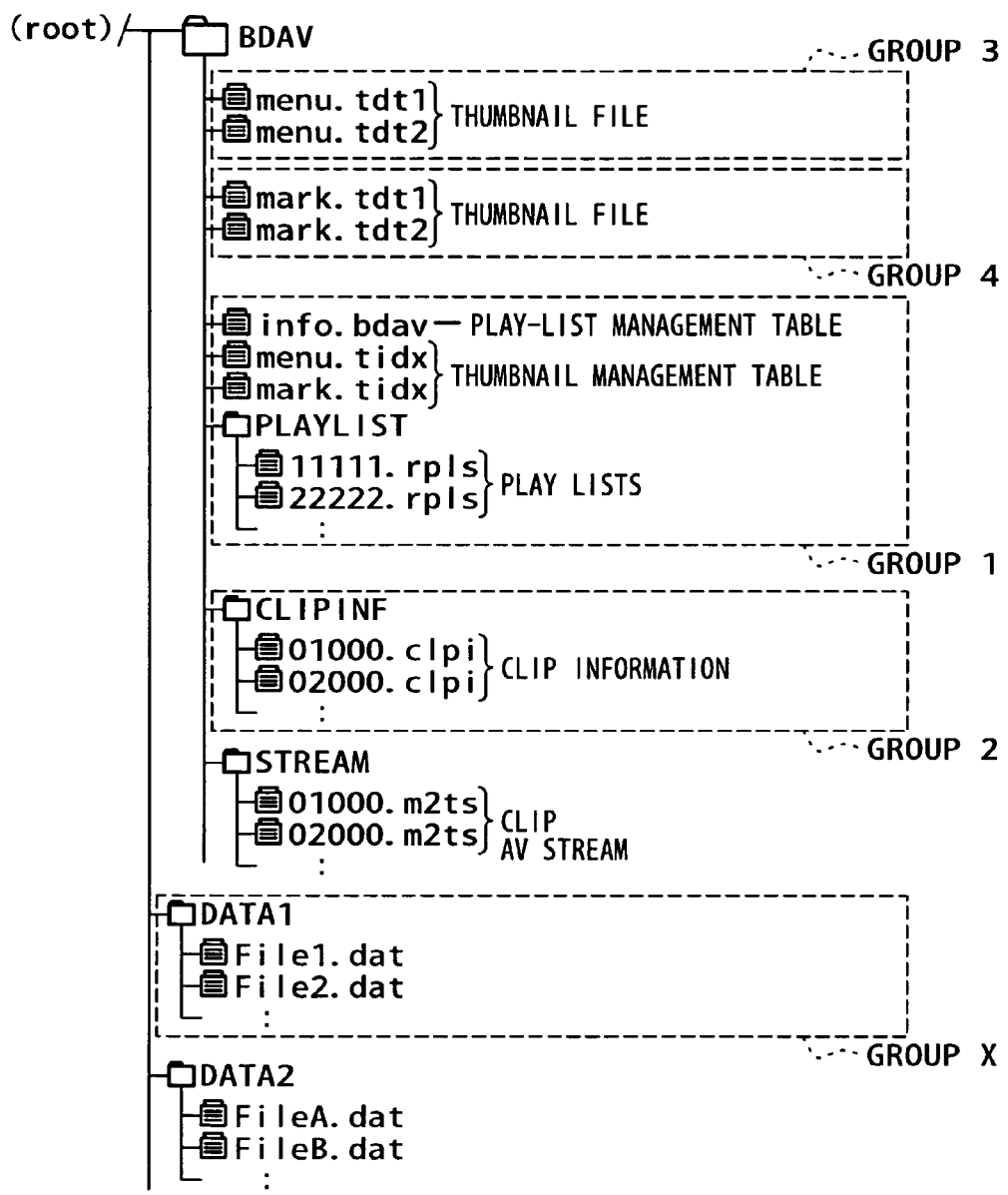
FIG. 4 is a diagram showing a typical organization of directories and files generated by the group management shown in FIG. 3.

Before explaining embodiments of the present invention, relations between inventions described in the specification and the embodiments are exemplified as follows. The following description merely confirms the fact that the embodiments supporting the inventions explained in the specification are described in the specification. Thus, even though an embodiment that would correspond to an invention is not described in this specification, the fact that the embodiment is not described in this specification does not imply that this embodiment does not correspond to the invention. Conversely speaking, the fact that an embodiment described in this specification as an embodiment corresponding to a specific invention described in this specification does not mean that this embodiment does not correspond to an invention other than the specific invention.

In addition, the following description is not intended to cover all inventions explained in this specification. In other words, even though the following description covers inventions explained in this specification, the following description does not deny existence of inventions not claimed in this present application. That is to say, the following description does not deny existence of inventions that may be claimed in a separate application, described as amendments or added in the future.

An information-recording/reproduction apparatus provided by the present invention is characterized in that the information-recording/reproduction apparatus includes: a recording unit (such as a write unit 73 shown in FIG. 2) for recording a file onto a recording medium; and a control unit (such as a file-system information generation unit 62 shown in FIG. 2) for controlling the recording unit to group files on the basis of attribute information and record the files in group units onto the recording medium wherein the attribute information includes the use frequency of each file, the size of each file and data indicating whether or not each file is used in a specific application program.

An information-recording/reproduction method provided by the present invention is characterized in that the information-recording/reproduction method includes: a recording step (such as steps S12 and S15 of a flowchart shown in FIG. 11) of recording a file onto a recording medium; and a control step (such as the step S15 of the flowchart shown in FIG. 11) of controlling processing carried out at the recording step to group files on the basis of attribute information and record the files in group units onto the recording medium wherein the attribute information includes the use frequency of each file, the size of each file and data indicating whether or not each file is used in a specific application program.

It is to be noted that explanations of a program provided by the present invention and a storage medium for storing the program are omitted because the program describes a method identical with the information-recording/reproduction method provided by the present invention.

FIG. 1 is a diagram showing the configuration of an embodiment implementing an information-recording/reproduction apparatus 1 provided by the present invention.

A CPU (Central Processing Unit) 11 carries out various kinds of processing by execution of programs stored in a ROM (Read Only Memory) 12 or a storage unit 18. A RAM (Random Access Memory) 13 is used for storing information such as a program being executed by the CPU 11 and data used in the program execution. The CPU 11, the ROM 12 and the RAM 13 are connected to each other by a bus 14.

The CPU 11 is also connected to an input/output interface 15 by the bus 14. The input/output interface 15 is connected to an input unit 16 and an output unit 17. The input unit 16 includes a keyboard, a mouse and a microphone whereas the output unit 17 includes a display unit and a speaker. The CPU 11 carries out various kinds of processing in accordance with commands received from the input unit 16. Then, the CPU 11 outputs, among others, a picture and a sound, which are obtained as results of the processing, to the output unit 17.

The storage unit 18 connected to the input/output interface 15 is typically a hard disc for storing programs to be executed by the CPU 11. A communication unit 19 is a component for communicating with an information-processing apparatus such as an external sever through a network represented by the Internet and an intranet.

The CPU 11 reads out a particular program from the storage unit 18 for storing a variety of programs and carries out processing corresponding to the particular program by execution of the particular program. The programs stored in the storage unit 18 include a basic program, which is referred to as an operating system, and drivers. A program stored in the storage unit 18 may be a program obtained from an external source through the communication unit 19.

A video/audio codec unit 20 is a component for decompressing video and audio files compressed by adoption of a predetermined compression method and supplying the decompressed video and audio files to an external connection I/F (interface) 21 and the output unit 17. The video/audio codec unit 20 reads out the compressed video and audio files from a drive 30, on which a magnetic disc 41, an optical disc 42, a magneto-optical disc 43 or a semiconductor memory 44 is mounted, or from a recording medium 81 of a recording/reproduction mechanism unit 22. Details of the recording/reproduction mechanism unit 22 are shown in FIG. 2. In addition, the video/audio codec unit 20 also compresses video and audio signals by adoption of a predetermined compression method and supplies the compressed video and audio signals to the drive 30 to be stored in the magnetic disc 41, the optical disc 42, the magneto-optical disc 43 or the semiconductor memory 44 or to the recording/reproduction mechanism unit 22 to be stored in the recording medium 81 employed in the recording/reproduction mechanism unit 22 as shown in FIG. 2.

The recording/reproduction mechanism unit 22 is a component for recording predetermined information onto the recording medium 81 employed therein as shown in FIG. 2. The recording medium 81 is a magneto-optical recording medium such as the Blu-Ray Disc (a trademark). The recording/reproduction mechanism unit 22 also reads out information from the recording medium 81. It is to be noted that a detailed configuration of the recording/reproduction mechanism unit 22 will be explained later by referring to FIG. 2.

When a magnetic disc 41, an optical disc 42, a magneto-optical disc 43 or a semiconductor memory 44 is mounted on the drive 30 connected to the input/output interface 15, the drive 30 drives the magnetic disc 41, the optical disc 42, the magneto-optical disc 43 or the semiconductor memory 44 to acquire a program or data from the magnetic disc 41, the optical disc 42, the magneto-optical disc 43 or the semiconductor memory 44 respectively. If necessary, the acquired program or data is transferred to the storage unit 18 to be stored therein.

Next, the operation of the information-recording/reproduction apparatus 1 shown in FIG. 1 is explained.

When the CPU 11 receives a command from the input unit 16 to record input data supplied to the information-recording/reproduction apparatus 1 by way of the external-connection I/F 21, the CPU 11 controls the video/audio codec unit 20 on the basis of a program stored in the ROM 12, the RAM 13 or the storage unit 18 to compress input data by adoption of a predetermined compression method and supply the compressed input data to the recording/reproduction mechanism unit 22 to be recorded into the recording medium 81 to be described later by referring to FIG. 2.

In addition, when the CPU 11 receives a command from the input unit 16 to reproduce data from the recording medium 81 mounted on the recording/reproduction mechanism unit 22, the CPU 11 controls the recording/reproduction mechanism unit 22 on the basis of a program stored in ROM 12, the RAM 13 or the storage unit 18 to reproduce the data from the recording medium 81 and supply the data to the video/audio codec unit 20. Then, the CPU 11 controls the video/audio codec unit 20 to decompress the reproduced data by adoption of a predetermined decompression method and output the decompressed data to an external apparatus by way of the external-connection I/F 21 or output the decompressed data to the output unit 17 for displaying a picture represented by the data or generating a sound also represented by the data.

Next, a detailed configuration of the recording/reproduction mechanism unit 22 is explained by referring to FIG. 2.

A control unit 51 is a component for controlling all operations carried out by the recording/reproduction mechanism unit 22. To be more specific, on the basis of control signals supplied from the CPU 11, the control unit 51 controls a recording unit 52 to drive a recording/reproduction block 53 to record information onto the recording medium 81 and controls a reproduction unit 54 to drive the recording/reproduction block 53 to read out information from the recording medium 81.

A file-system information generation unit 62 employed in the control unit 51 is a component for generating file-system information and supplying the information to the recording unit 52. The file-system information is information required for processing to group files containing predetermined attributes included in input data on the basis of an attribute of each file containing the input data. The processing to group such files is also referred to as group management. On the basis of the file-system information, a write unit 73 employed in the recording unit 52 is controlled to drive a recording/reproduction block 53 to record a file onto the recording medium 81. In addition, on the basis of the file-system information, the file-system information generation unit 62 controls the recording unit 52 to record grouped files into a contiguous area on the recording medium 81. On top of that, when a command to update or change a file is received, the file-system information generation unit 62 stores information contained in a file to be updated or to receive additional data in accordance with the command in an update information storage unit 63. Then, the file stored in the update information storage unit 63 is updated or additional data is added to the file. Finally, in accordance with the update or add command, an entire group including the file serving as a target of the update or add command is stored into another contiguous area on the recording medium 81 if the file serving as a target of the update or add command is a file serving as an object of the group management.

A file-system information recognition unit 61 employed in the control unit 51 receives file-system information from the reproduction unit 54 and, on the basis of the file-system information, reads out a predetermined file from the recording medium 81. To put it in detail, on the basis of the file-system information, the file-system information recognition unit 61 employed in the control unit 51 controls a read unit 91 employed in the reproduction unit 54 to read out the file from the recording medium 81. If the specific file to be read out from the recording medium 81 is a file serving as an object of the group management, all files pertaining to a group including the specific file are read out from a predetermined contiguous area on the recording medium 81.

The write unit 73 or the read unit 91 controls the recording/reproduction block 53 to physically record or reproduce information onto or from the recording medium 81. The recording medium 81 is a medium allowing information to be recorded thereon mechanically, optically, magnetically or magneto-optically. Thus, information can be recorded on the recording medium 81 repeatedly or only once. That is to say, the recording medium 81 can be any recording medium without regard to whether information can be recorded on the recording medium 81 repeatedly or only once as long as the recording medium is a disc-type recording medium allowing data to be recorded thereon and reproduced from it. Examples of the recording medium 81 allowing information to be recorded thereon repeatedly are a DVD-RW (Digital Versatile Disc-Rewritable) and a DVD-RAM (Digital Versatile Disc-Random Access Memory) whereas examples of the recording medium 81 allowing information to be recorded thereon only once are a DVD-R (Digital Versatile Disc-Recordable) and a DVD-ROM (Digital Versatile Disc-Read Only Memory). Thus, the recording/reproduction block 53 can be any recording/reproduction unit as long as the recording/reproduction unit is capable of recording and reproducing data onto and from the recording medium 81.

An ECC-coding unit 71 employed in the recording unit 52 is a component for adding an error correction code to an input, coding the input including the error correction code and supplying a result of coding to a modulation unit 72 also employed in the recording unit 52. The modulation unit 72 is a component for modulating data supplied from the ECC-coding unit 71 and outputting a result of modulation to the write unit 73. The write unit 73 is a component for carrying out processing to pass on data received from the modulation unit 72 to the recording/reproduction block 53 to be written onto the recording medium 81.

The read unit 91 employed in the reproduction unit 54 is a component for reading out information from the recording medium 81. A demodulation unit 92 employed in the reproduction unit 54 is a component for demodulating data read out by the read unit 91 from the recording medium 81 and supplying the demodulated data to an ECC-decoding unit 93 also employed in the reproduction unit 54. The ECC-decoding unit 93 is a component for splitting the data received from the demodulation unit 92 into an ordinary file and file-system information, and outputting the ordinary file as output data while supplying the file-system information to the control unit 51. An example of the ordinary file is a file containing AV (Audio Visual) stream data or the like.

By referring to FIG. 3, the following description explains the configuration of management of input-data files each serving as an object of the group management executed by the file-system information generation unit 62.

FIG. 3 is a diagram showing an example of management of a variety of data files as management executed in recording AV stream data onto a rewritable recording medium. The configuration of the management conforms to a management structure defined by specifications of Blu-Ray Disc Rewritable (a trademark). FIG. 3 shows three layers, i.e., a content management layer on the top, a play-list layer beneath the content management layer and a clip layer at the bottom.

The content management layer includes a play-list management table 111 and a thumbnail management table 112. The play-list layer includes play lists 113-1 to 113-3. The clip layer includes pieces of clip information 121-1 to 121-3. It is to be noted that, in the following description, the play lists 113-1 to 113-3 are referred to simply as a play list 113 if there is no need to distinguish them from each other. By the same token, the pieces of clip information 121-1 to 121-3 are referred to simply as clip information 121 if there is no need to distinguish them from each other, and other components are referred to by the same way as described above.

A clip particularly refers to a combination of a file of two files, i.e., a file of an AV stream 131 and a file of clip information 121. In this case, the file of clip information 121 has attribute information of an AV stream 131. The AV stream 131 is typically MPEG-TS (Moving Picture Experts Group-Transport Stream) data. The file of an AV stream 131 is a file having a structure comprising multiplexed pieces of video, audio or caption information. In some cases, the AV stream 131 includes a command multiplexed therein as a command for executing control at a reproduction time. As a matter of fact, the figure shows an example in which the AV streams 131 each include a command multiplexed therein.

A play list has a structure including a plurality of play items each referring to a specific range of a clip by using a reproduction start point and a reproduction end time. Thus, a play list presents a function for continuously reproducing a plurality of reproduction sequences. In addition, the management structure includes the play-list management table 111 as a table showing play lists to the user, the thumbnail management table 112 used in a thumbnail display function and thumbnails 141-1, 141-2, 151-1 and 151-2 for the thumbnail management table 112.

A pair consisting of an AV stream 131 and its attached information is regarded as an object referred to as a clip. A file containing an AV stream 131 is referred to as an AV-stream file and its attached information is known as clip information 121.

In general, a file used in a computer or the like is treated as a byte array. However, the contents of an AV stream 131 are spread along the time axis. A play list 113 specifies an access point in clip information 121 mainly as a timestamp. When a timestamp of an access point in a clip is given in the play list 113, the clip information 121 is used for finding an address or a data byte position in the AV stream 131. The data byte position is an address, from which a process to decode the stream is to be started.

A play list 113 is used for selecting a reproduction segment from a clip as a segment that the user wants to see. A play list 113 is introduced for the purpose of allowing the selected reproduction segment to be edited with ease. A play list 113 is a collection of reproduction segments in a clip. A reproduction segment in a clip is referred to as a play item, which is expressed in terms of IN and OUT points on the time axis. Therefore, a play list is a collection of play items.

In the management structure shown in FIG. 3, files are grouped by considering usage and update frequencies of each file and the total size of the files as follows. The play-list management table 111, the thumbnail management table 112 and the play list 113 are collected in group 1, the clip information 121 in group 2, the menu-use thumbnail 141 in group 3 and the mark-use thumbnail 151 in group 4.

These grouped files are management data, which is required when an AV stream 131 is reproduced. By managing and extracting pieces of management data in group units, the management data can be read out speedily. As a result, AV-stream data can reproduced at a high speed.

It is to be noted that, while the above description explains an example of grouping files of management data for AV streams 131, files not defined by the Blu-Ray Disc Rewritable specifications can also be grouped. To put it concretely, in the management structure shown in the figure, group X is defined as a group of files different from the files of management data for AV streams 131. In this example, the files included in group X are files 161-1 and 161-2. It is also worth noting that files 171-1 and 171-2 shown in the figure are files not grouped. In addition, since an AV stream 131 itself is not management data, the AV stream 131 is not used as an object of management based on groups.

FIG. 4 is a diagram showing a typical organization of directories of BDAV (Blu-Ray Disc Audio Visual) information recorded on the recording medium 81 in a BD-RE (Blu-Ray Disc Rewritable) format. It is to be noted that, a directory other than those shown in the figure can be created under a root directory. However, data recorded in a file under the other directory is not treated as the BDAV (Blu-Ray Disc Audio Visual) information.

As shown in the figure, there is only one directory named BDAV directly under the root directory.

All files and directories recorded under the BDAV directory are those prescribed in a BDAV application format. The directories under the BDAV directory are described as follows.

A PLAYLIST directory is a directory for recording database files of play lists 113. This directory is created even if there is no play list 113 at all.

A CLIPINF directory is a directory for recording databases of clips. This directory is created even if there is no clip at all.

A STREAM directory is a directory for recording AV stream files. This directory is created even if there is no AV stream file at all.

The PLAYLIST directory is a directory for recording two types of play list file, i.e, Real Playlist and Virtual Playlist. In the case of the typical BDAV directory shown in FIG. 4, files named 11111.rpls and 22222.vpls are recorded as Real Playlist and Virtual Playlist respectively. A file named xxxxx.rpls is a file for holding information on Real Playlist. This file is created for each play list. The file name xxxxx is a number of five digits each having a value in the range 0 to 9.

A file named yyyyy.vpls is a file for holding information on Virtual Playlist. This file is created for each play list. The file name yyyyy is a number of five digits each having a value in the range 0 to 9.

Real Playlist is a play list sharing a stream portion of clips referred to thereby. That is to say, Real Playlist occupies a disc area for storing an amount of data corresponding to the AV stream portion of clips referred to by Real Playlist. If an AV stream is recorded as a new clip, Real Playlist referring to the entire reproducible range of the clip is generated. If a portion of the reproducible range of Real Playlist is deleted, the data of the stream portion of the clip referred to by Real Playlist is also deleted.

Virtual Playlist is a play list that does not share data of clips. Thus, even if Virtual Playlist is changed or deleted, the clips do not change at all. It is to be noted that, in the explanation of this specification, the technical term play list is used for both Real Playlist and Virtual Playlist.

The CLIPINF directory is a directory for recording a file for each AV stream file. In the typical BDAV directory shown in FIG. 4, files named 01000.clpi and 02000.clpi are held in the CLIPINF directory.

A file named zzzzz.clpi contains clip information 121 corresponding to an AV stream 131. The name of the file is zzzzz.clpi. The file name zzzzz is a number of five digits each having a value in the range 0 to 9.

The STREAM directory is a directory for recording AV stream files. In the typical BDAV directory shown in FIG. 4, files named 01000.m2ts and 02000.m2ts are held therein.

A file named zzzzz.m2ts is a file containing an AV stream 131. The name of the file is zzzzz.m2ts. The file name zzzzz is a number of five digits each having a value in the range 0 to 9. It is to be noted that a file containing a AV stream 131 and a file containing clip information 121 corresponding to the AV stream 131 have the same file name zzzzz, which is a number of five digits as described above.

Moreover, right below the BDAV directory, files menu.tdt1 and menu.tdt2 corresponding to the thumbnail files 141-1 and 141-2 respectively are held. In addition, files mark.tdt1 and mark.tdt2 corresponding to the thumbnail files 151-1 and 151-2 respectively are held. Furthermore, file info.bdav corresponding to the play-list management table 111 as well as files menu.tidx and mark.tidx corresponding to the thumbnail management table 112 are held.

In addition, right below the root directory, DATA1 and DATA2 directories are set. In the DATA1 directory, files File1.dat, File2.dat and so on corresponding to the files 161-1, 161-2 and so on respectively are each held as a file serving as an object of the group management. By the same token, in the DATA2 directory, files FileA.dat, FileB.dat and so on corresponding to the files 171-1, 171-2 and so on respectively are each held as a file serving as an object of the group management.

Files and directories managed under the directory shown in FIG. 4 are managed as follows. As shown in FIG. 3, files menu.tdt1 and menu.tdt2 corresponding to the thumbnail files 141-1 and 141-2 respectively are grouped and held in group 1. Files mark.tdt1 and mark.tdt2 corresponding to the thumbnail files 151-1 and 151-2 respectively are grouped and held in group 4. File info.bdav corresponding to the play-list management table 111, files menu.tidx and mark.tidx corresponding to the thumbnail management table 112, files 11111.rpls and 22222.vpls provided under the PLAYLIST directory as well as files 01000.clpi and 02000.clpi provided under the CLIPINF directory are grouped and held in group 2.

In addition to the files each serving as an object of the group management by a using BDFS file system, files File1.dat, File2.dat and so on held under the DATA1 directory as files corresponding to the files 161-1, 161-2 and so on respectively are collected in group X.

FIGS. 3 and 4 show a management structure in file grouping based on specifications of Blu-Ray Disc Rewritable (a rewritable recording medium). Next, a typical management structure (a logical format) used in file grouping based on specifications of Blu-Ray Disc ROM (a read-only recording medium) is explained by referring to FIGS. 5 and 6. In particular, FIG. 5 is a diagram showing a typical case in which HD (High Density) movie contents are recorded.

Figure 5:
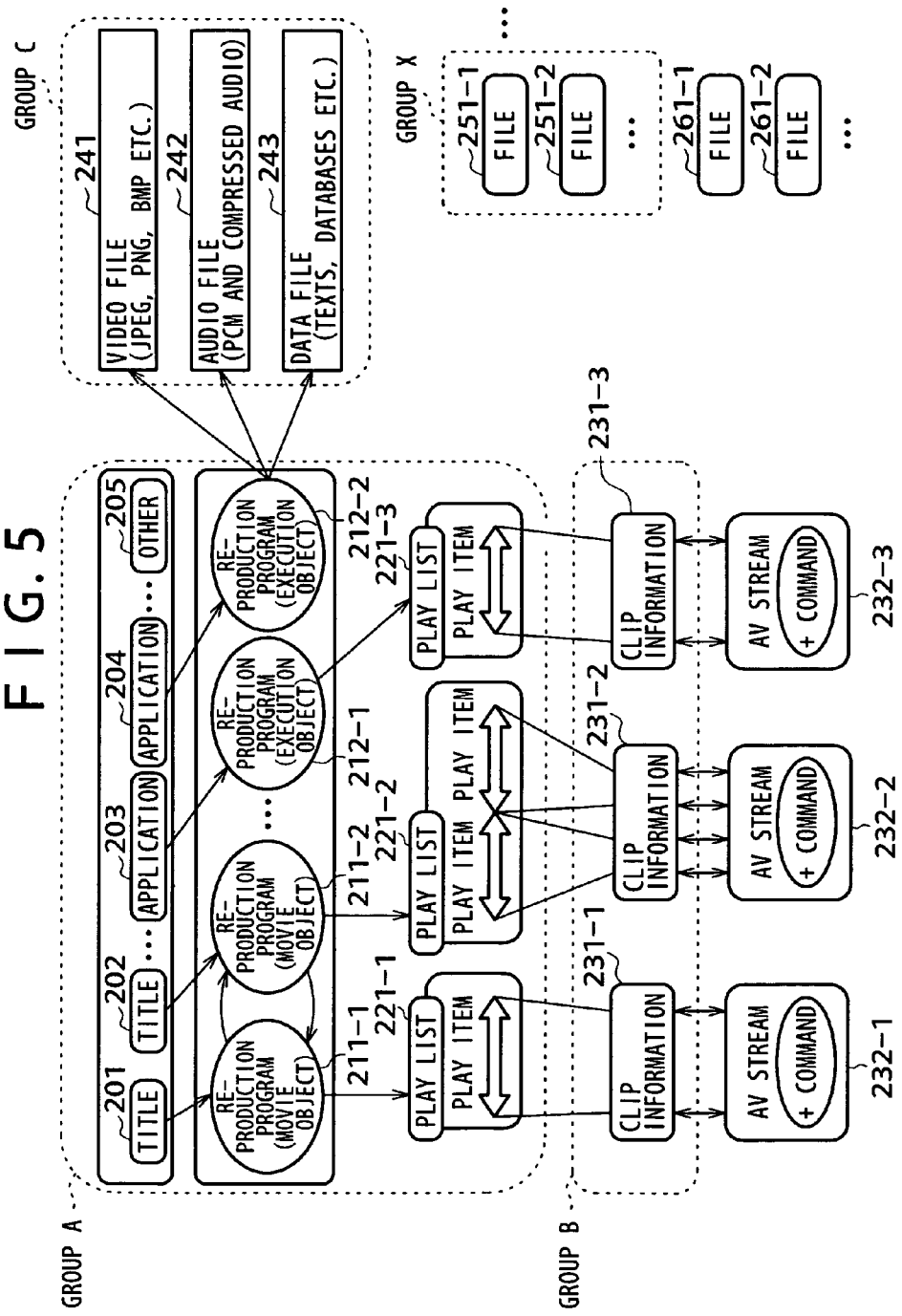
FIG. 5 is a diagram showing another example of the group management.

It is to be noted that, in the typical case shown in FIG. 5, play lists 221-1 to 221-3, pieces of clip information 231-1 to 231-3, AV streams 232-1 to 232-3, files 251-1 and 252-2 as well as files 261-1 and 261-2 are similar to respectively the play lists 113-1 to 113-3, the pieces of clip information 121-1 to 121-3, the AV streams 131-1 to 131-3, the files 161-1 and 161-2 as well as the files 171-1 and 171-2 shown in FIG. 3. Thus, their descriptions are not repeated to avoid duplications.

Above the clip information 231 and the play list 221, which have been explained earlier by referring to FIG. 3, there are two layers, i.e., a layer of reproduction programs (or movie objects) 211-1 and 211-2 and a layer of titles 201 and 202 as shown in FIG. 5. The reproduction program (movie object) 211 provides a function, which is required in presentation of HD movie contents, in a programmable form. The HD movie contents include a specification of a play list to be reproduced, a response to an operation carried out by the user, a jump between the titles 201 and 202 and a reproduction-sequence branching.

The titles 201 and 202 can be recognized by the user and each used as an index for starting reproduction of contents. The titles 201 and 202 each have a structure specifying one of movie objects to be executed. In addition to ordinary titles, there are also a title automatically reproduced at an initial time and a title for displaying a menu.

Application programs 203 and 204 are each a program for executing a web content or a game serving as an extended application. When executing a web content or a game, the application program 203 or 204 activates a reproduction program (or an execution object) 212-1 or 212-2 respectively. The reproduction program 212 may use or not use a play list. In addition, the reproduction program 212 is capable of referring to an arbitrary video file 241, an arbitrary audio file 242 and an arbitrary file 243 in the application programs 203 and 204.

The number of titles 201 and 202 each showing an HD movie content and the number of application programs 203 and 204 can be increased. Other 205 shown in FIG. 5 represents additional titles and additional application programs. In addition, they can be recorded on the recording medium 81 in a state of coexistence. As a matter of fact, FIG. 5 shows a state of coexistence.

Much like the management structure shown in FIG. 3, also in the management structure shown in FIG. 5, files are grouped by considering usage and update frequencies of each file and the total size of the files as follows. The titles 201 and 202, the application programs 203 and 204, the other 205, the reproduction programs 211-1, 211-2, 212-1 and 212-2 as well as the play lists 221-1 to 221-3 are collected in group A. Clip information 231 is put in group B. The video file 241, the audio file 242 and the file 243 are gathered in group C.

It is to be noted that groups A, B and C shown in FIG. 5 are separated from each other and have different names only for the sake of convenience as is the case with groups 1, 2, 3 and 4 shown in FIG. 3. Groups A, B and C are the same as groups 1, 2, 3 and 4 in that they are each a collection of files to be processed.

Figure 6:
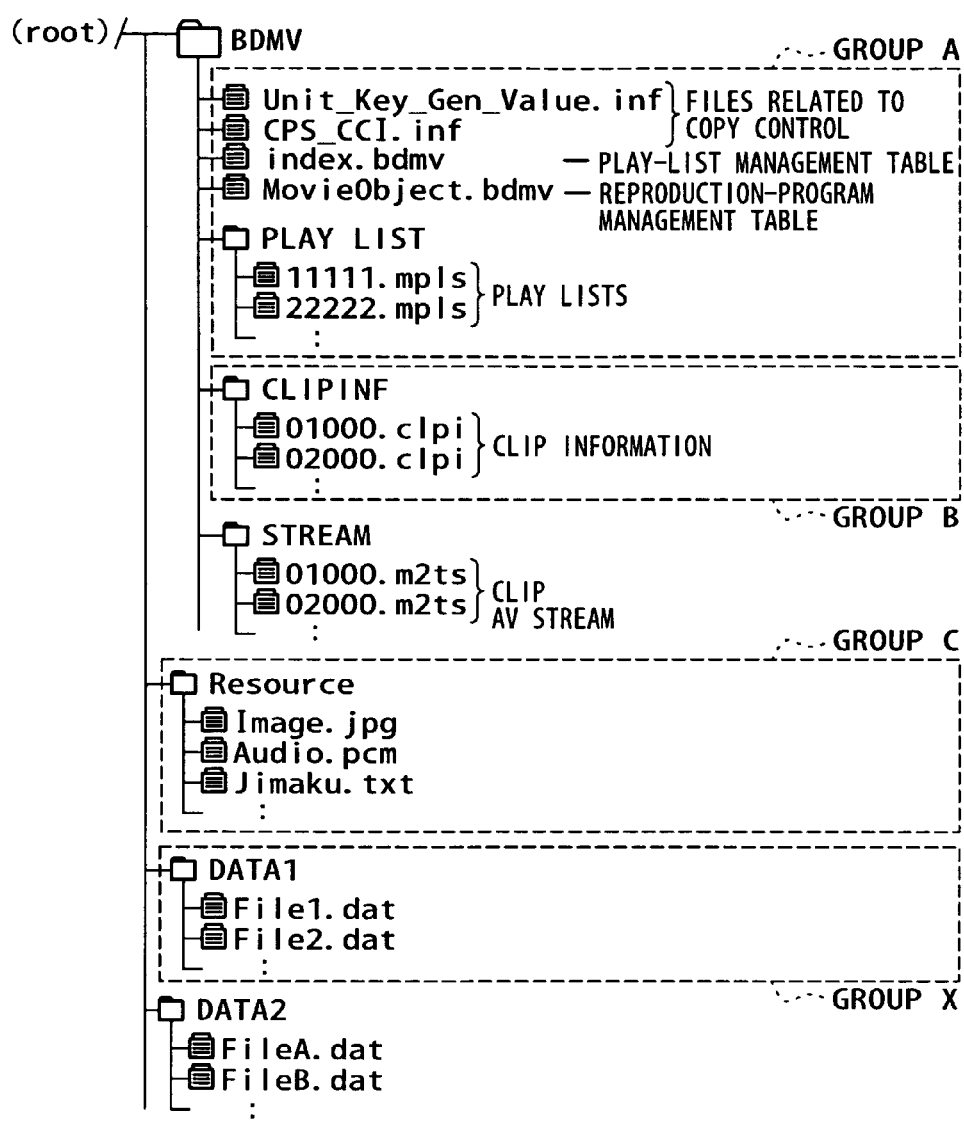
FIG. 6 is a diagram showing a typical organization of directories and files generated by the group management shown in FIG. 5.

FIG. 6 is a diagram showing a typical directory structure of BDMV (Blu-Ray Disc Movie) information recorded on the recording medium 81 as information defined in a BD-ROM (Blu-Ray Disc ROM) format. It is to be noted that a directory other than those shown in the figure can be created. However, such a created directory is ignored in UDF recording.

As shown in the figure, there is at least one directory directly under a root directory.

All files and directories recorded under a BDMV directory are those prescribed in a BDMV application format. The directories under the BDMV directory are described as follows.

A PLAYLIST directory is a directory for recording database files of play lists 221. This directory is created even if there is no play list 221 at all.

A CLIPINF directory is a directory for recording databases of clips. This directory is created even if there is no clip at all.

A STREAM directory is a directory for recording AV stream files. This directory is created even if there is no AV stream file at all.

In the case of the typical BDMV directory shown in FIG. 6, files named 11111.mpls and 22222.mpls are recorded in the PLAYLIST directory. A file named xxxxx.mpls is a file for holding information on Movie Playlist. This file is created for each play list. The file name xxxxx is a number of five digits each having a value in the range 0 to 9.

The CLIPINF directory is a directory for recording a file for each AV stream file. In the typical BDMV directory shown in FIG. 6, files named 01000.clpi and 02000.clpi are held in the CPIPINF directory.

A file named zzzzz.clpi contains clip information 231 corresponding to an AV stream 232. The name of the file is zzzzz.clpi. The file name zzzzz is a number of five digits each having a value in the range 0 to 9.

The STREAM directory is a directory for recording AV stream files. In the typical BDMV directory shown in FIG. 6, files named 01000.m2ts and 02000.m2ts are held therein.

A file named zzzzz.m2ts is a file containing an AV stream 232. The name of the file is zzzzz.m2ts. The file name zzzzz is a number of five digits each having a value in the range 0 to 9. It is to be noted that a file containing an AV stream 232 and a file containing clip information 231 corresponding to the AV stream 232 have the same file name zzzzz, which is a number of five digits as described above.

Moreover, right below the BDMV directory, files named Unit_Key_Gen_Value.inf and CPS_CCI.inf are held as files related to copy control. In addition, a file named index.bdmv is held as a file containing a play-list management table. Furthermore, a file named MovieObject.bdmv is held as a file of a reproduction-program management table.

In addition, right below the root directory, Resource, DATA1 and DATA2 directories are set. These directories are not directories indispensably required in the Blu-Ray Disc ROM format. However, these directories are each added as a typical directory for storing extension data, which is required in dependence on the data of a content. The Resource directory is a directory for holding files each serving as an object of the group management. Files held in the Resource directory are files Image.jpg, Audio.pcm and Jimaku.txt, which correspond to the video file 241, the audio file 242 and the file 243 respectively. In the DATA1 directory, files File1.dat, File2.dat and so on corresponding to the files 251-1, 251-2 and so on respectively are held. By the same token, in the DATA2 directory, files FileA.dat, FileB.dat and so on corresponding to the files 261-1, 261-2 and so on respectively are held.

Files and directories managed under the directory shown in FIG. 6 are managed as follows. Files named Unit_Key_Gen_Value.inf, CPS_CCI.inf, index.bdmv, MovieObject.bdmv as well as files 11111.mpls and 22222.mpls provided under the PLAYLIST directory are grouped and held in group A. Files 01000.clpi and 02000.clpi provided under the CLIPINF directory are grouped and held in group B. Files Image.jpg, Audio.pcm and Jimaku.txt provided under the Resource directory are grouped and held in group C.

In addition to the files each serving as an object of the group management cited above, files File1.dat, File2.dat and so on held under the DATA1 directory as files corresponding to the files 251-1, 251-2 and so on respectively are collected in group X.

Figure 7:
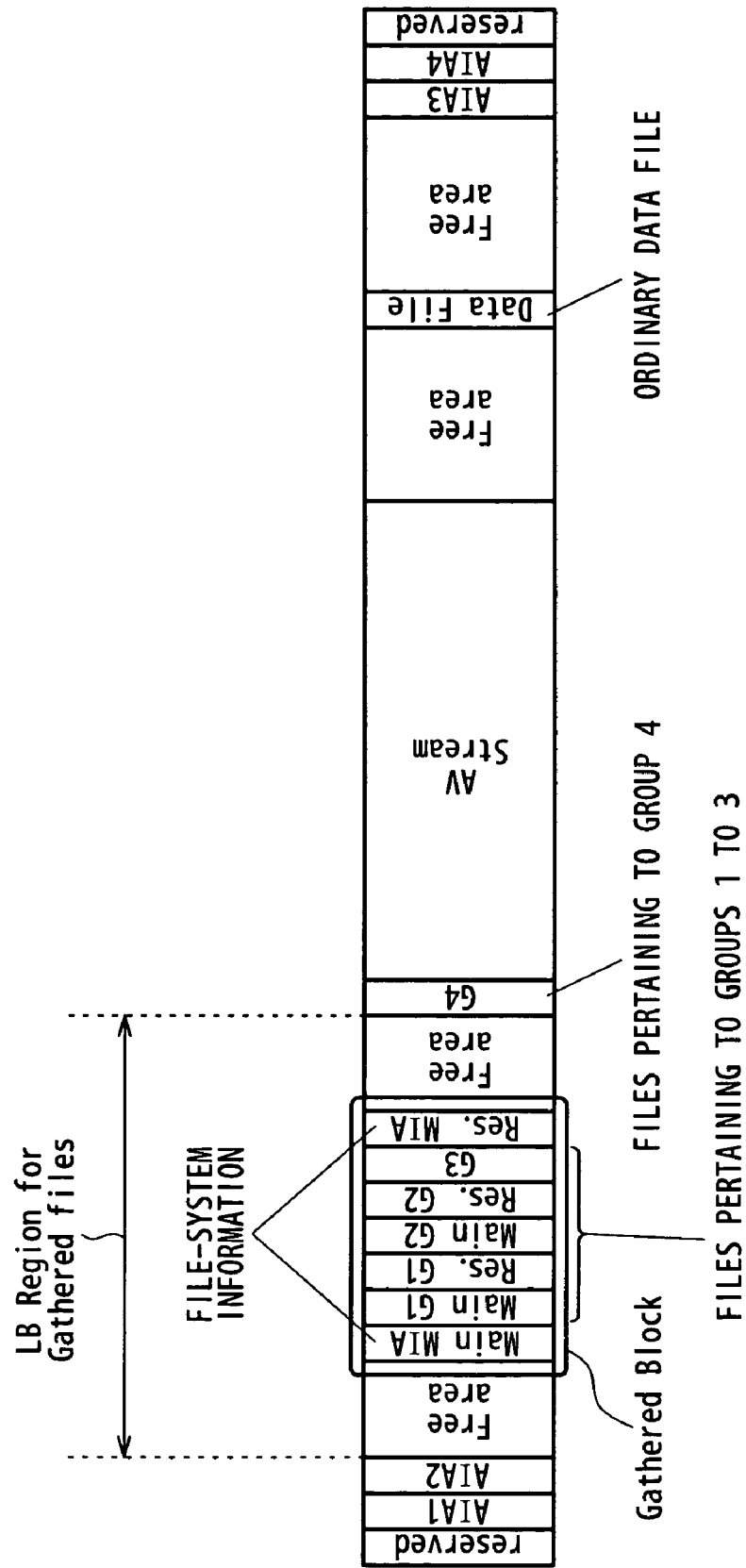
FIG. 7 is an explanatory diagram showing a typical layout of data recorded on a recording medium.

By referring to FIG. 7, the following description explains a file system characterized in that files to be recorded onto a recording medium are grouped and laid out in group units in accordance with specific rules. In the following description, the file system BDFS conforming to the Blu-Ray Disc specifications is taken as an example.

Areas containing no data are provided at the beginning and end of the layout shown in figure. These areas are each referred to as a reserved area.

Portions referred to as AIAs (Allocation Information Areas) 1 to 4 in the layout shown in the figure are each allocated as a fixed area. These AIAs 1 to 4 are each used for storing information to be read out initially in an operation to read out data from the recording medium. To be more specific, inside each of these AIAs 1 to 4, addresses of an MIA (Management Information Area) are stored. In the MIA, file-system information is recorded. Thus, by analyzing the addresses stored in an AIA, an access can be made to the MIA.

It is to be noted that the AIA is divided into two types of area, i., e., Main MIA and Reserved MIA.

As described above, an MIA is used for holding file-system information, which is information on directories and files recorded on the recording medium, in a form allowing the information to be changed. To put it in detail, the file-system information is information on grouping of files and information on a method of placing the files. In accordance with the Blu-Ray Disc Rewritable specifications, as shown in FIG. 7, an MIA is a gathered-file area for collectively recording information on three file groups 1 to 3 to be described later. In the figure, the three file groups are referred to as Main G1, Res.G1, Main G2, Res.G2 and G3. In the figure, the gathered-file area is referred to as a gathered block in an LB region for gathered files. They are managed by using grouping IDs, which are each called an allocation class set for each group. For example, Main G1, Main G2, G3 and G4 are managed as allocation class 1 (AC1), AC2, AC3 and AC4 respectively.

The values of a concrete allocation class include AC0 indicating an ordinary file, AC1 indicating a file pertaining to group 1, AC2 indicating a file pertaining to group 2, AC3 indicating a file pertaining to group 3, AC4 indicating a file pertaining to group 4, unused AC5 to AC15, AC16 indicating real-time file type 1 (low rate), AC17 indicating real-time file type 2 (high rate) and unused AC18 to AC255.

In an MIA, information is recorded as information on a recording area allocated to each group. For example, an ARST (Allocation Rule Set Table shown in FIG. 8) in the file-system information is recorded in an MIA. As shown in the figure, the ARST includes the start and end addresses of an area allocated to each group. By using these pieces of information in an operation to read out data from the recording medium, the data is read out not in file units, but can be instead read out in group units each consisting of collected files. Thus, it is possible to shorten the time it takes to read out the data from the recording medium.

It is to be noted that groups in the ARST shown in FIG. 8 are Main G1, Res.G1, Main G2, Res.G2, G3 and G4. SMG1 and EMG1 are recorded as respectively the start and end addresses of an area allocated to group Main G1. SRG1 and ERG1 are recorded as respectively the start and end addresses of an area allocated to group Res.G1. SMG2 and EMG2 are recorded as respectively the start and end addresses of an area allocated to group Main G2. SRG2 and ERG2 are recorded as respectively the start and end addresses of an area allocated to group Res.G2. SG3 and EG3 are recorded as respectively the start and end addresses of an area allocated to group G3. SG4 and EG4 are recorded as respectively the start and end addresses of an area allocated to group G4. That is to say, group Main G1 is recorded in an area between start address SMG1 and end address EMG1. By the same token, group Res.G1 is recorded in an area between start address SRG1 and end address ERG1. In the same way, group Main G2 is recorded in an area between start address SMG2 and end address EMG2. Likewise, group Res.G2 is recorded in an area between start address SRG2 and end address ERG2. Similarly, group G3 is recorded in an area between start address SG3 and end address EG3. By the same token, group G4 is recorded in an area between start address SG4 and end address EG4.

By providing the configuration described above, the file-system information and files collected in groups 1 to 3 can be read out in a continuous-area read operation from a recording medium for recording information in conformity with the Blu-Ray Disc Rewritable specifications. It is to be noted that groups 1 to 4 shown in the figure conform to the grouping method explained earlier by referring to FIGS. 3 and 4.

Groups 1 to 3, that is, G1, G2 and G3, which are shown in the figure, are each application management data in the Blu-Ray Disc Rewritable specifications. It is necessary to read out files collected in each of these groups from the recording medium at a high speed and, as described above, pieces of information on the groups are stored collectively in an MIA cited earlier in the Gathered File area. Files pertaining to groups 1 and 2 are files indispensably required in reproduction of the content associated with the files. Since a mechanism is required as a mechanism losing no data of a file to the greatest extent possible even if a defect sector exists on the recording medium, the files pertaining to groups 1 and 2 are recorded in both the main area and the reserved area with the files in the reserved area serving as copies of those recorded in the main area.

Group 4 shown as G4 in the figure is a group for storing information on thumbnails for mark use. It is necessary to collectively record files of the information on thumbnails in this group. However, the usage frequency of this group is low in comparison with groups 1 to 3, and the necessity to read out all the information at the start time of accesses to the recording medium is also low. Nevertheless, this G4 group is recorded as an elementary substance in a contiguous recording area. The G4 group is, however, not recorded in the Gathered File area, which includes the other groups.

An AV-stream file has an attribute of assurance of a sufficient rate at a reproduction time. The attribute of assurance of a sufficient rate at a reproduction time is necessity to abide by a relocation rule for assuring the rate at a reproduction time in a process to place files on a recording medium. It is not necessary to group AV-stream files and place the group in a specific recording area like groups 1 to 4 described above. For this reason, the attribute of an AV-stream file is defined even though AV-stream files do not have to be collectively placed on the recording medium. In addition, an ordinary file not defined in the Blu-Ray Disc specifications does not have to be recorded on the recording medium in accordance with the placement method for collectively recording files in a specific recording area, and the assurance of a sufficient rate at a reproduction time is not required in the recording process either. Thus, an ordinary file is recorded at a still further location. An ordinary file is referred to as a data file shown in the figure.

It is to be noted that areas each referred to as a free area in FIG. 7 are each an area in which no files are recorded.

It is to be noted that the file-system configuration shown in FIG. 7 is no more than a typical configuration of a file system conforming to the Blu-Ray Disc specifications. The file system can be a file system conforming to other specifications or abiding by a rule but allowing the rule to be changed for the sake of flexibility.

By referring to FIG. 9, the following description explains general operations conforming to the Blu-Ray Disc Rewritable specifications, operations not related to the Blu-Ray Disc Rewritable specifications and the existence/non-existence of file changes in file-system information and a variety of groups explained earlier by referring to FIG. 7.

In a table shown in FIG. 9, examples of a specific application operation include a play-list creation, a play-list division, a play-list concatenation, a play-list complete deletion, a play-list partial deletion, a virtual play-list-editing operation using no bridge, a virtual play-list-editing operation using a bridge, a virtual play-list deletion, an after-recording sound set operation, a play-list display-order modification, a menu thumbnail addition and a mark thumbnail addition. Typical operations other than the specific application operations are an addition of a file not conforming to application specifications and a deletion of a file not conforming to the specifications. An example of a file not conforming to the specifications is a file for storing a JPEG picture or the like.

A circle shown in the table of FIG. 9 indicates that an operation on the same row as the circle results in a change in a column item on the same column as the circle. The column item is one of the MIA, a file pertaining to groups 1 to 4 referred to as G1 to G4 shown in the figure, an AV stream and a non-application-specific file, which are shown on the top row of the table. On the other hand, the '-' mark indicates that the operation on the same row as the '-' mark does not result in such a change in a column item on the same column as the '-' mark.

As shown in the table of FIG. 9, processing of the play-list creation and processing of the virtual play-list-editing operation using a bridge changes the MIA, files pertaining to groups 1 and 2 and the AV stream. Processing of the play-list division, processing of the play-list concatenation, processing of the play-list complete deletion, processing of the partial play-list deletion, processing of the virtual play-list-editing operation using no bridge, processing of the virtual play-list deletion, processing of the after-recording sound set operation and processing of the play-list display-order modification change the MIA and a file pertaining to group 1. Processing of the menu thumbnail addition changes the MIA and files pertaining to groups 1 and 3. Processing of the mark thumbnail addition changes the MIA and files pertaining to groups 1 and 4. Processing of the addition of a file not conforming to application specifications such as a JPEG-picture file changes the MIA and non-application-specific files. Processing of the deletion of a file not conforming to the specifications changes the MIA only.

As described above, the file-system information (the MIA) is changed by all the operations. However, only some of the operations change files pertaining to groups.

It is to be noted that a group-unit change is caused by an operation to record a new file onto the recording medium and an operation to change the contents of an already recorded file by re-recording data of the file. An operation to merely delete a file make an area for storing the file so far available. In this case, a collection of remaining files recorded on the specific recording area in a group unit left as it is. That is to say, it is not necessary to again record the entire group except the deleted file.

Figure 10:
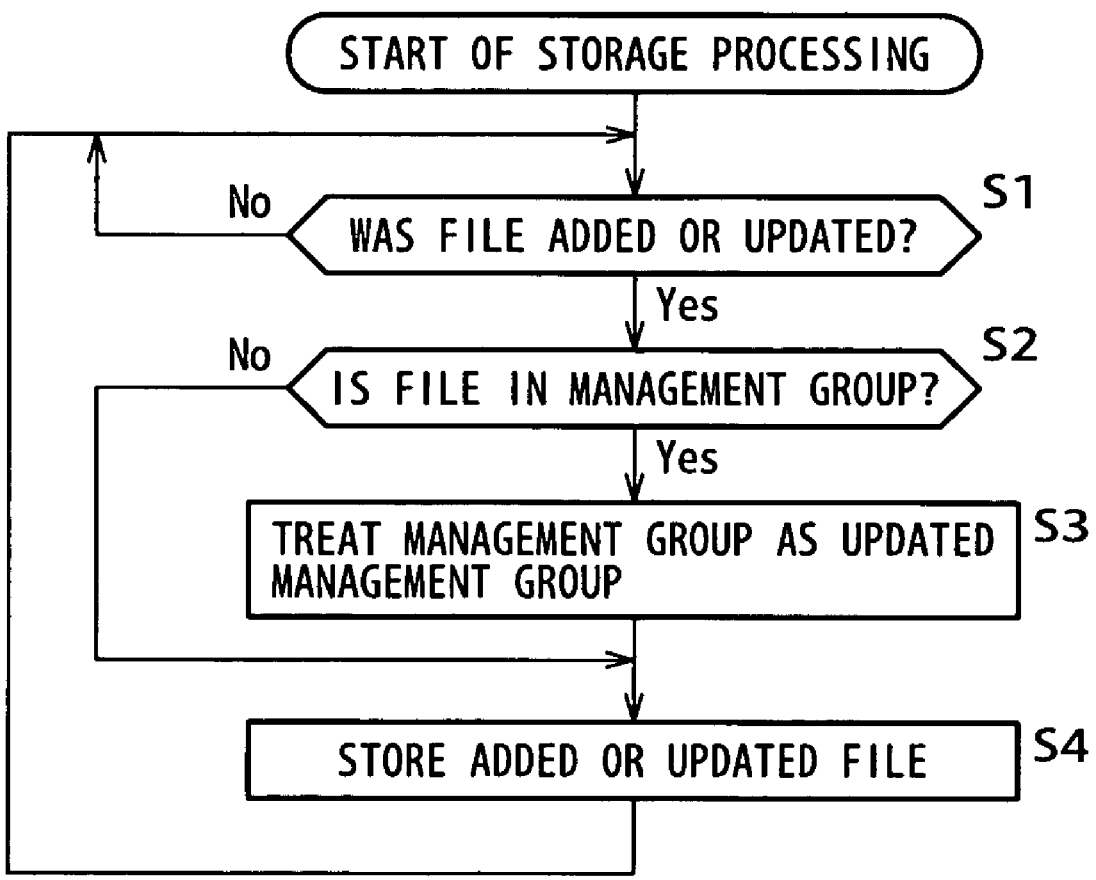
FIG. 10 shows a flowchart representing a process carried out by the recording/reproduction mechanism unit shown in FIG. 2 to store data.

Next, a data-storing process carried out by the recording/reproduction mechanism unit 22 shown in FIG. 2 is explained by referring to a flowchart shown in FIG. 10.

The flowchart begins with a step S1 at which the file-system information generation unit 62 determines whether or not a file has been added or updated. If a result of determination indicates that no file has been added or updated, the execution of the step is repeated. The step is executed repeatedly till a file is added or updated. As a file is added or updated, the flow of the processing goes on to a step S2.

At the step S2, on the basis of an attribute of the added or updated file, the file-system information generation unit 62 determines whether or not the added or updated file is a file pertaining to a management group, that is, whether or not the added or updated file is an object of the group management or, to put it concretely, whether or not the added or updated file is a file pertaining to one of Main G1, Res.G1, Main G2, Res.G2 and G3, which are shown in FIG. 7.

If the determination result obtained at the step S2 indicates that the added or updated file is a file pertaining to a management group, the flow of the processing goes on to a step S3 at which the file-system information generation unit 62 records the fact that a process to add or update a file has been carried out in the update information storage unit 63.

Then, at the next step S4, the file-system information generation unit 62 records information of the added or updated file in the update information storage unit 63.

If the determination result obtained at the step S2 indicates that the added or updated file is not a file pertaining to a management group, on the other hand, the execution of the step S3 is skipped.

By carrying out the processing described above, if a file is added or updated, the fact that a process to add or update the file has been carried out and information of the file are stored in the update information storage unit 63.

Figure 11:
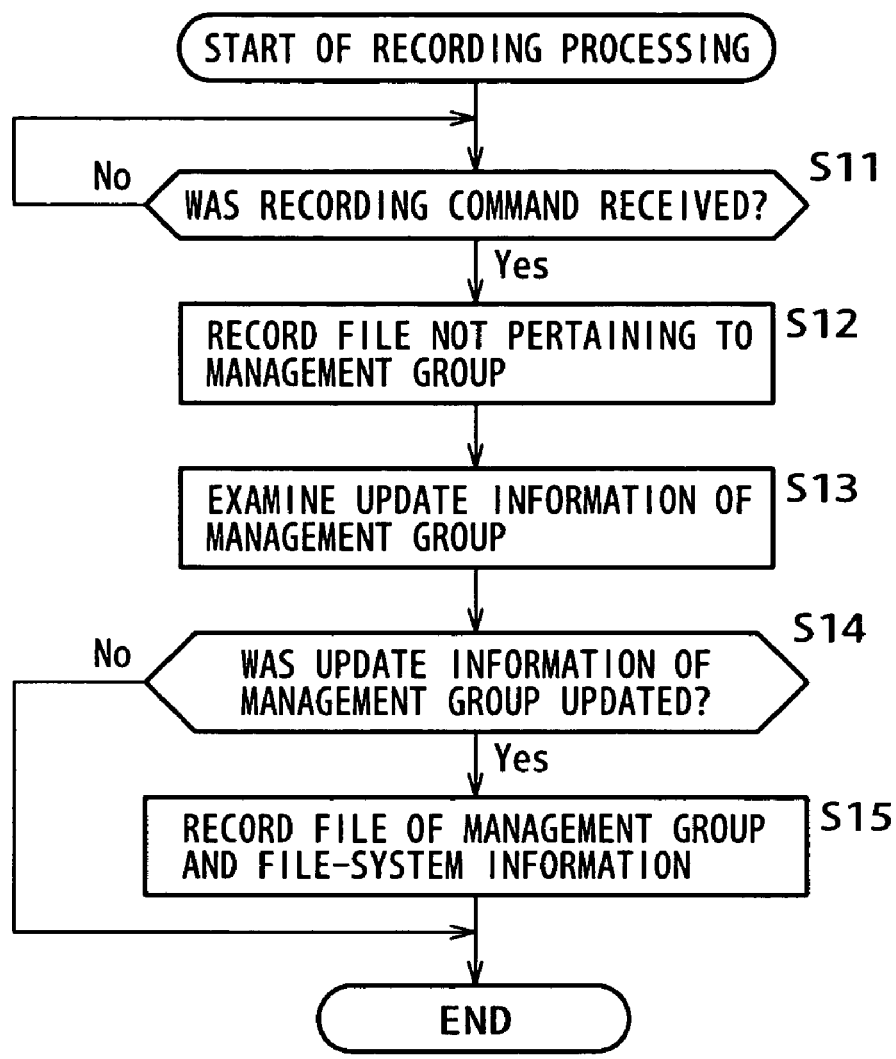
FIG. 11 shows a flowchart representing a process carried out by the recording/reproduction mechanism unit shown in FIG. 2 to store a file.

Next, a file-storing process carried out by the recording/reproduction mechanism unit 22 shown in FIG. 2 is explained by referring to a flowchart shown in FIG. 11.

The flowchart begins with a step S11 at which the file-system information generation unit 62 determines whether or not a command to store a file has been received. If a result of determination indicates that no command to store a file has been received, the execution of the step is repeated. The step is executed repeatedly till a command to store a file is received. As the result of determination obtained at the step S11 indicates that a command to store a file has been received, the flow of the processing goes on to a step S12 at which the file-system information generation unit 62 reads out information of an added or updated file not serving as an object of the group management from the update information storage unit 63, and controls the write unit 73 to record the information of the file not serving as an object of the group management into a new area on the recording medium 81 in the recording/reproduction block 53. At the same time, the file-system information generation unit 62 generates file-system information for the file recorded in the new area and then records the file-system information onto the recording medium 81 in the recording/reproduction block 53 in the same way. To put it in more detail, the file-system information generation unit 62 enquires of the file-system information recognition unit 61 for file-system information and, on the basis of the file-system information, acquires information on the present state of recording on the recording medium 81. Then, the file-system information generation unit 62 specifies the address of the new area on the recording medium 81 on the basis of the information on the present state of recording, and stores the information of the file in the new area.

Figure 12:
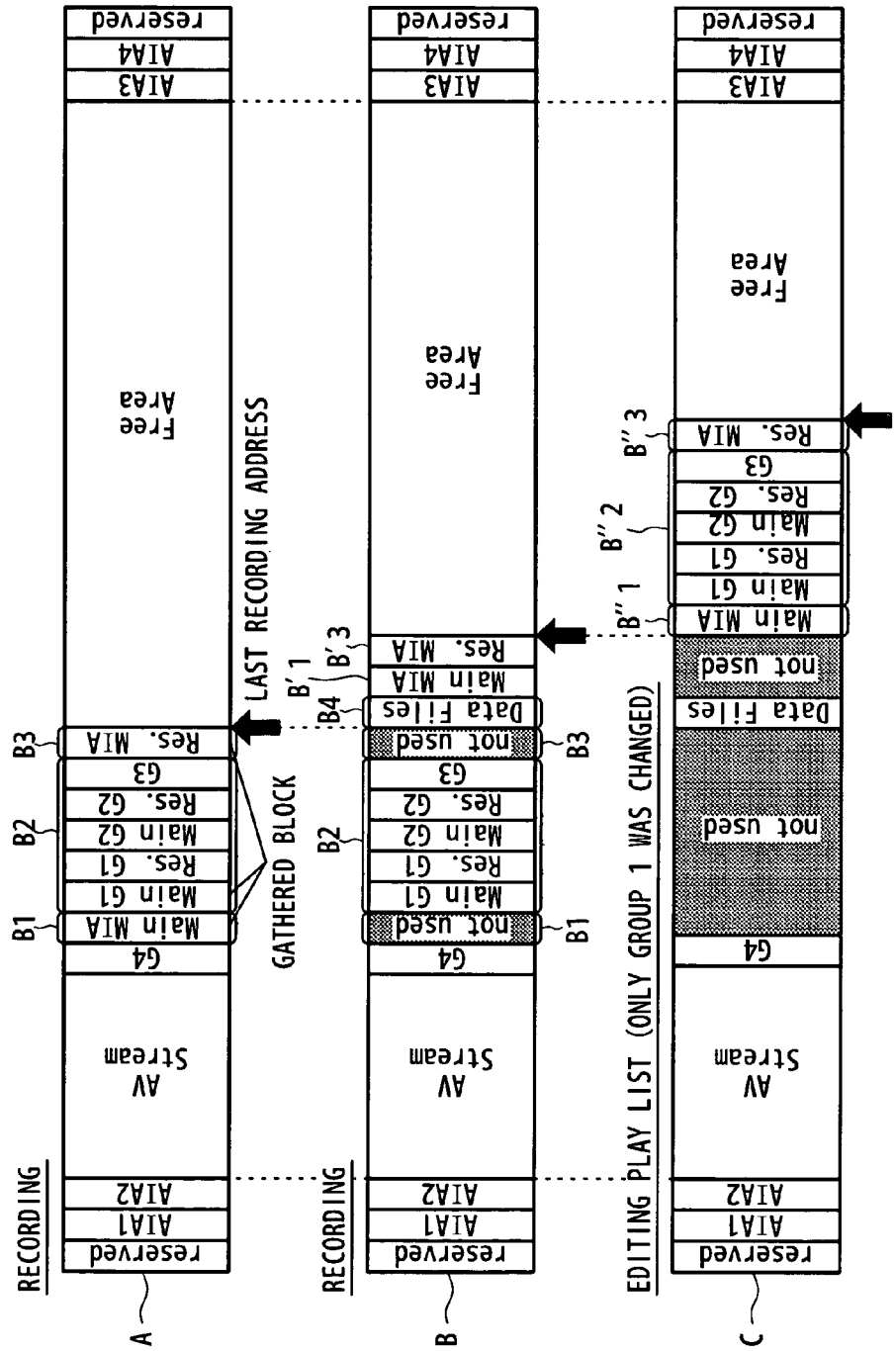
FIG. 12 is an explanatory diagram showing a recording process carried out by the recording/reproduction mechanism unit shown in FIG. 2.

For example, let state A shown in FIG. 12 be the state of recording on the recording medium 81 prior to the process to add or update the file. In this case, the state of recording is changed to state B in the process carried out at the step S12.

It is to be noted that, in state A, a reserved area at the left end of the figure is followed sequentially by AIA1, AIA2, an AV Stream, G4, Main MIA, Main G1, Res.G1, Main G2, Res.G2, G3, Res.MIA, a free area, AIA3, AIA4 and another reserved area at the right end. In the process carried out at the step S12, first of all, the recording/reproduction block 53 records the file not serving as an object of the group management in block B4 in the free area on the recording medium 81 at a location closest to blocks B1, B2 and B3 comprising files each serving as an object of the group management. The file not serving as an object of the group management is referred to as a data file in the figure. Since the file-recording process changes information on locations of files recorded on the recording medium 81, the MIA for storing the corresponding file-system information is updated and, at the same time, Main MIA and Res.MIA are newly recorded in blocks B'1 and B'3 respectively as shown in FIG. 12B. In addition, information recorded in the AIA as information on the locations of Main MIA and Res.MIA is updated to information pointing to blocks B'1 and B'3 respectively. As a result, blocks B1 and B3 used so far as areas for recording Main MIA and Res.MIA respectively are put in an unreferenced state. In FIG. 12B, blocks B1 and B3 are each shown as a not-used block. It is to be noted that the process of the step S12 is a process carried out only for a case in which a file not serving as an object of the group management is added or updated. Thus, if no file not serving as an object of the group management is added or updated, the process of this step is virtually skipped.

Then, at the next step S13, the file-system information generation unit 62 examines the update information storage unit 63 to determine whether or not a file pertaining to a management group has been added or updated. Subsequently, the flow of the processing goes on to a step S14 to determine whether or not update information of the management group has been updated or whether or not an added or updated file serving as an object of the group management exists. If the update information of a management group has been updated or an added or updated file serving as an object of the group management exists, the flow of the processing goes on to a step S15.

At the step S15, the file-system information generation unit 62 reads out the added or updated file serving as an object of the group management from the update information storage unit 63 and records all files pertaining to the management group including the file serving as an object of the group management onto the recording medium 81 on the basis of an allocation class, which is the attribute of the file serving as an object of the group management. In addition, the file-system information generation unit 62 generates file-system information for the management group and records the information onto the recording medium 81 along with the files of the management group.

Assume for example that a file pertaining to group G1 has been updated or added. In this case, the processing carried out at the step S15 changes the recording state of the recording medium 81 from state B to state C as shown in FIG. 12. To put it in detail, first of all, the processing carried out at the step S15 updates the MIA containing the corresponding file-system information because information on the locations of files on the recording medium 81 has been changed by the recording operation. Then, the recording/reproduction block 53 records Main MIA containing the file-system information in block B"1 at a location closest to blocks B1, B2, B3, B4, B'1 and B'3 included in the free area on the recording medium 81 as blocks for recording files each serving as an object of the group management. In addition, the recording/reproduction block 53 records Main G1, Res.G1, Main G2, Res.G2 and G3, which serve as a group of files each serving as an object of the group management, in block B"2. Furthermore, the recording/reproduction block 53 records Res.MIA used as a backup of the file-system information in block B"3. Then, information recorded in the AIA as information on the locations of Main MIA and Res.MIA is updated to information pointing to blocks B"1 and B"3. As a result of the processing carried out as described above, block B2 used so far as a block for recording a file serving as an object of the group management as well as blocks B'1 and B'3 used for recording the immediately previous file-system information are put in an unreferenced state or shown as blocks in not-used areas in the figure. As is obvious from FIG. 12, in the change from state A to state B and the change from state B to state C, newly recorded data and newly recorded file-system information are put in regions included in the free area as regions closest to an area used so far as an area for recording data as shown in the figure. It is to be noted, however, that the newly recorded data and the newly recorded file-system information can be actually recorded at any locations in the free area.

Traditionally, without regard to whether the added or updated file is a file serving as an object of the group management, every time any file is added or updated, the MIA and all files each serving as an object of the group management are recorded in new blocks, and blocks used so far as areas for recording the MIA and all the files each serving as an object of the group management are put in an unusable state. That is to say, in accordance with the conventional method, every time any file is added to the recording medium 81, any file already recorded on the recording medium 81 is updated, the MIA and all files each serving as an object of the group management are recorded in new blocks, and blocks used so far as areas for recording the MIA and all the files each serving as an object of the group management are put in an unusable state. In accordance with the processing carried out as described above, on the other hand, when a file not serving as an object of the group management is added or updated, the processing can be completed by recording only the added or updated file itself and the MIA containing the file-system information in new blocks. Thus, information of a block for recording files each serving as an object of the group management but not used as an object of the file addition or an object of the file updating can be used thereafter as it is so that recording areas on the recording medium 81 can be used effectively. In addition, files each serving as an object of the group management is recorded continuously in a single block. Thus, by making an access to two blocks, the files each serving as an object of the group management can be read out continuously. The two blocks are the block for recording the files each serving as an object of the group management and a block for storing Res.MIA and Main MIA for recording file-system information. As a result, a high speed to read out files can be assured with a sufficiently high degree of reliability. To put it in more detail, these pieces of data can be acquired by reading out them not more than twice from contiguous areas (blocks). Thus, for example, content management data can be acquired at a high speed at the start of an access to the recording medium and a menu screen can hence be displayed in a short period of time.

In accordance with the above description, when a file serving as an object of the group management is added or updated, blocks that can no longer be actually used are the same as those of the conventional method. To put it more concretely, when a file serving as an object of the group management is added or updated, only blocks of a group to which the added or updated file pertains are newly recorded and the recording state of other blocks can be left as it is.

Figure 13:
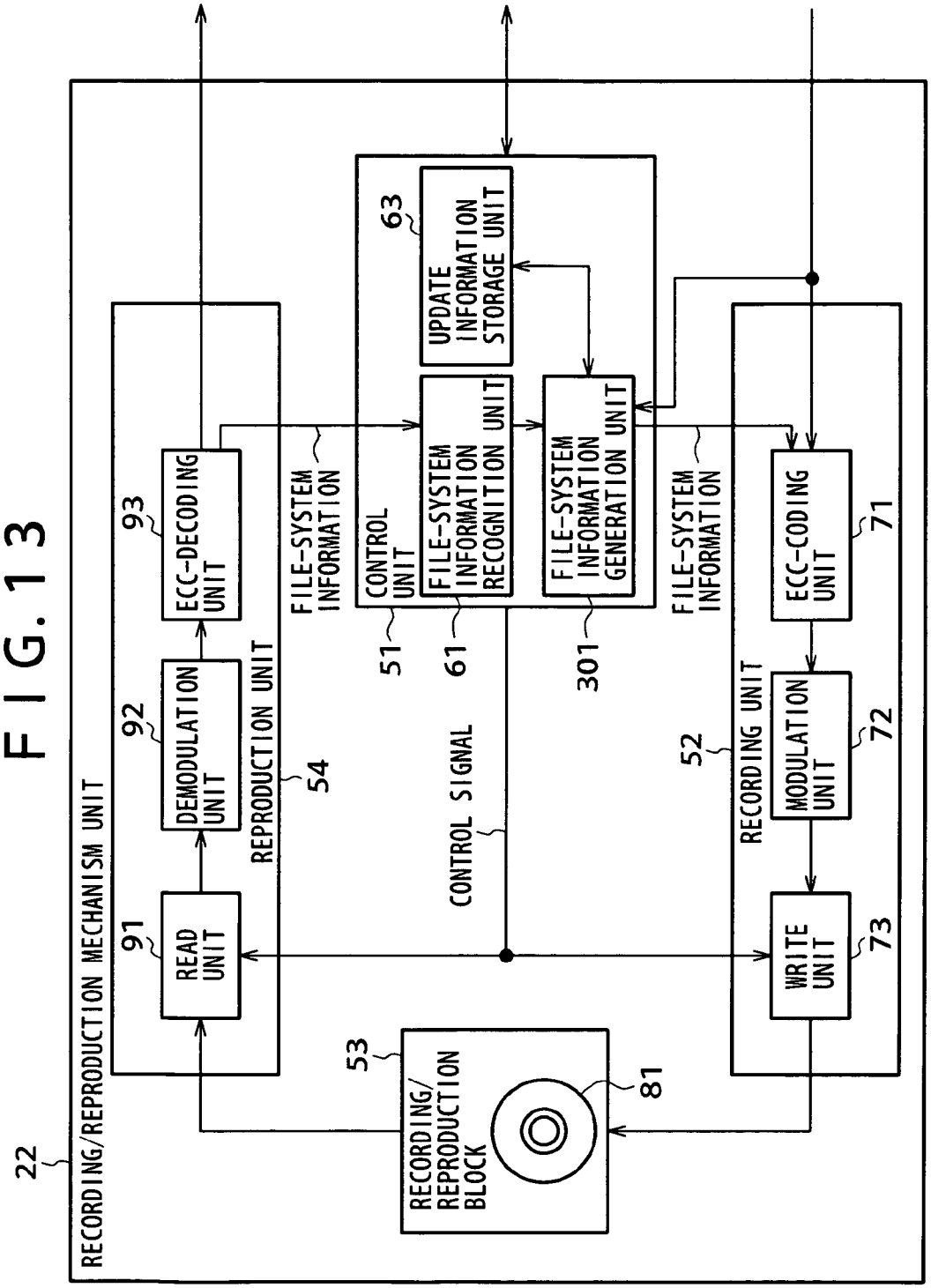
FIG. 13 is a diagram showing another configuration of the recording/reproduction mechanism unit employed in the recording/reproduction apparatus shown in FIG. 1.

FIG. 13 is a diagram showing the configuration of a recording/reproduction mechanism unit 22 for newly recording only blocks of a group to which an added or updated file serving as an object of the group management pertains and keeping the recording state of other blocks as it is when a file serving as an object of the group management is added or updated. It is to be noted that configurations elements identical with their counterparts employed in the recording/reproduction mechanism unit 22 shown in FIG. 2 are denoted by the same reference numerals of the counterparts, and their descriptions are not repeated to avoid duplications.

The configuration of the recording/reproduction mechanism unit 22 shown in FIG. 13 is different from the configuration of the recording/reproduction mechanism unit 22 shown in FIG. 2 in that the recording/reproduction mechanism unit 22 shown in FIG. 13 employs a file-system information generation unit 301 serving as a substitute for the file-system information generation unit 62.

The file-system information generation unit 301 basically has the same function as the file-system information generation unit 62 except that, in the file-system information generation unit 301, when a file serving as an object of the group management is added or updated, information of a group to which the added or updated file pertains is stored in the update information storage unit 63, the write unit 73 is controlled to drive the recording/reproduction block 53 to newly record only blocks of the group including the added or updated file onto the recording medium 81 and the recording state of other blocks can be left as it is. That is to say, the file-system information generation unit 301 puts the blocks used for recording all files pertaining to a group unit in an unusable state to accompany an operation to add or update any one of the files.

Next, a data-storing process carried out by the recording/reproduction mechanism unit 22 shown in FIG. 13 is explained by referring to a flowchart shown in FIG. 14. It is to be noted that, since processes carried out at steps S21, S22 and S25 are the same as those performed at respectively the steps S1, S2 and S4 of the flowchart shown in FIG. 10, their descriptions are not repeated to avoid duplications.

At a step S23, the file-system information generation unit 301 identifies a management group to which an added or updated file pertains on the basis of the attribute of the file.

Then, at the next step S24, the file-system information generation unit 301 records the event of adding or updating the file pertaining to the identified management group in the update information storage unit 63.

By carrying out the processing described above, the event of adding or updating a file serving as an object of the group management and information of the file pertaining to a management group are stored in the update information storage unit 63 when the file is added or updated.

Figure 15:
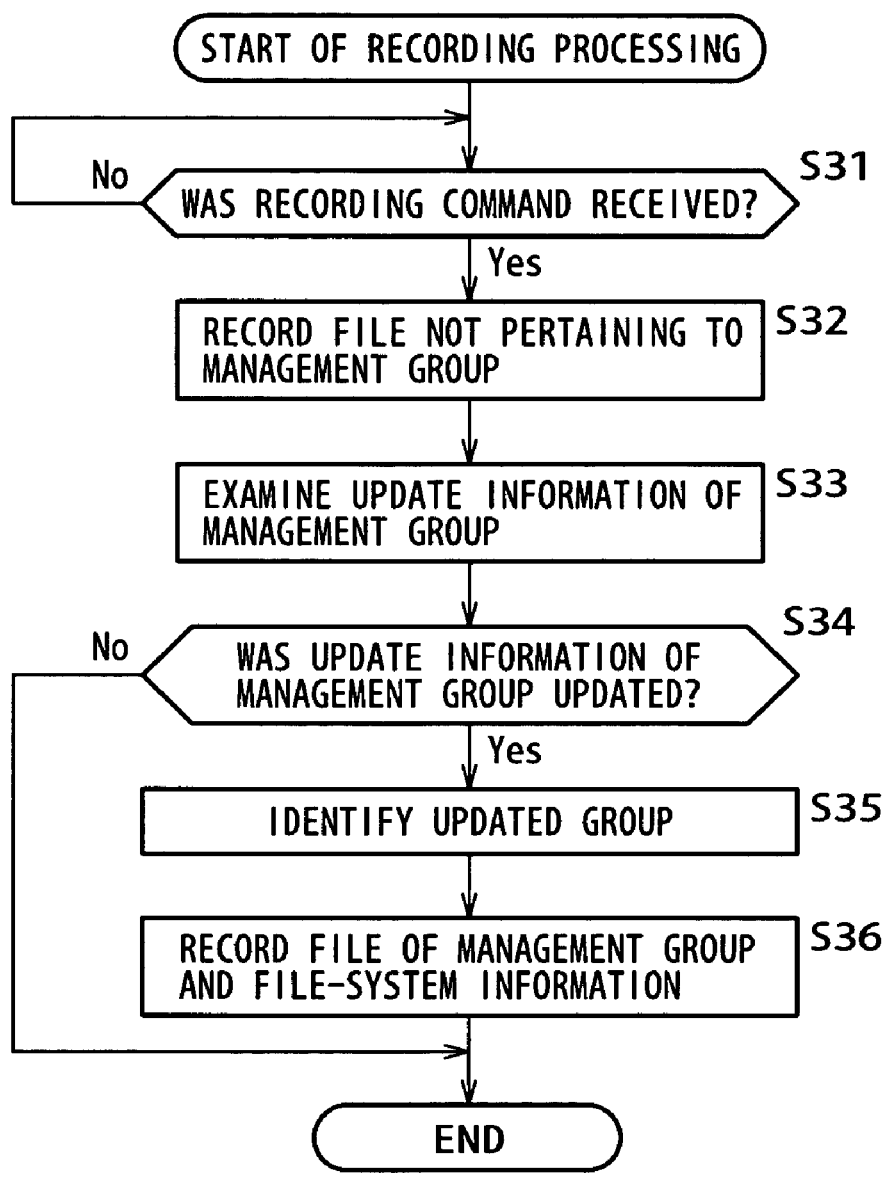
FIG. 15 shows a flowchart representing a process carried out by the recording/reproduction mechanism unit shown in FIG. 13 to store a file.

Next, a file-storing process carried out by the recording/reproduction mechanism unit 22 shown in FIG. 13 is explained by referring to a flowchart shown in FIG. 15. It is to be noted that, since processes carried out at steps S31 to S34 are the same as those performed at respectively the steps S11 to S14 of the flowchart shown in FIG. 11, their descriptions are not repeated to avoid duplications.

At a step S35, the file-system information generation unit 301 identifies a management group to which an added or updated file serving as an object of the group management pertains. Then, at the next step S36, the file-system information generation unit 301 reads out information of the added or updated file serving as an object of the group management from the update information storage unit 63, stores all files pertaining to the identified management group in the recording medium 81, generates corresponding file-system information and also records the generated file-system information in the recording medium 81.

Assume for example that a file pertaining to group G1 is added or updated. In this case, in the process carried out at the step S36, the recording state of the recording medium 81 is changed from state B to state C as shown in FIG. 16.

Figure 16:
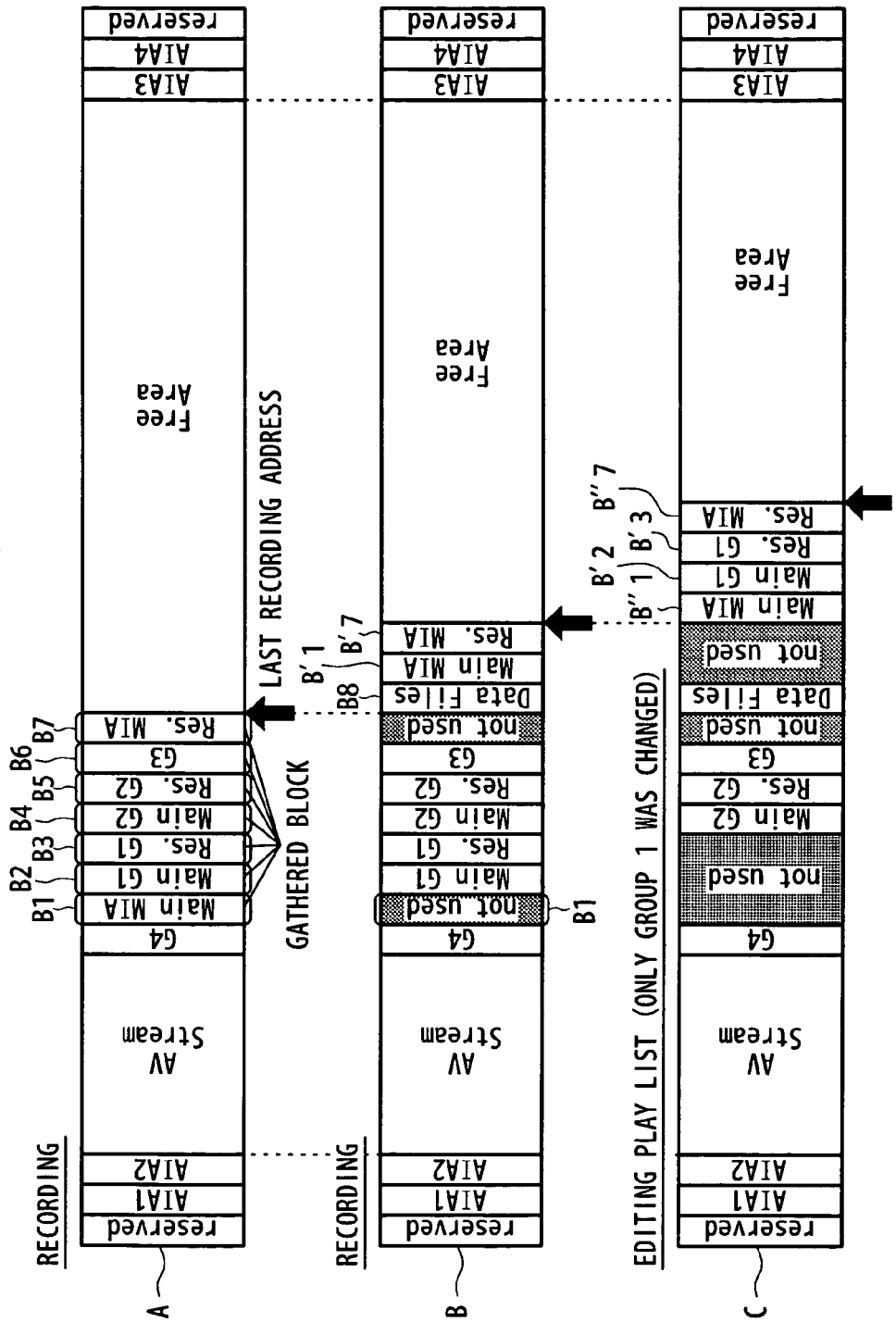
FIG. 16 is an explanatory diagram showing a recording process carried out by the recording/reproduction mechanism unit shown in FIG. 13.

It is to be noted that, state B shown in FIG. 16 is the same as state B shown in FIG. 12 so that it is not necessary to repeat its explanation. In state A shown in FIG. 12, Main G1, Res.G1, Main G2, Res.G2 and G3 form one block. In state A shown in FIG. 16, however, they can be managed separately. Thus, they are put in blocks B2 to B6 respectively whereas Main MIA and Res.MIA are put in blocks B1 and B7 respectively.

That is to say, in the recording process carried out at the step S36, first of all, since information on locations of files recorded on the recording medium 81 are changed as a consequence of this recording process, the MIA containing corresponding file-system information is updated. Then, the recording/reproduction block 53 records the Main MIA containing the file-system information in block B"1 at a location closest to blocks B8, B'1 and B'7 existing in a free area on the recording medium 81 as blocks for recording files each serving as an object of the group management. Then, Main G1 and Res.G1, which contain a collection of files each serving as an object of the group management, are recorded in blocks B'2 and B'3 respectively. Furthermore, Res.MIA for a backup of the file-system information is recorded in block B"7. Then, information recorded in the AIA as information on the locations of Main MIA and Res.MIA is updated to information pointing to blocks B"1 and B"7 respectively. As a result of the processing carried out as described above, blocks B2 and B3 used so far as blocks for recording respectively Main G1 and Res.G1 among groups each comprising files each serving as an object of the group management as well as blocks B'1 and B'7 used for recording the immediately previous file-system information are put in an unreferenced state or shown as blocks in not-used areas in the figure. As is obvious from FIG. 16, in the change from state A to state B and the change from state B to state C, newly recorded data and newly recorded file-system information are put in regions included in the free area as regions closest to an area used so far as an area for recording data as shown in the figure. It is to be noted, however, that the newly recorded data and the newly recorded file-system information can be actually recorded at any locations in the free area.

In accordance with the processing carried out as described above, when a file serving as an object of the group management is added or updated, the processing can be completed by recording only the added or updated file of the management group including the added or updated file and the file-system information in new blocks. Thus, information of a block for recording files pertaining to the management group but not serving as an object of file addition or file updating can be used thereafter as it is so that recording areas on the recording medium 81 can be used effectively. In addition, files each serving as an object of the group management is recorded continuously in a single block for each group. Thus, by making an access to blocks, the files each serving as an object of the group management can be read out continuously. The accessed blocks are the block for recording the files each serving as an object of the group management and blocks for storing Res.MIA and Main MIA for recording file-system information. As a result, a high speed to read out files can be assured with a sufficiently high degree of reliability. To put it in more detail, these pieces of data can be acquired by reading out them not more than four times from contiguous areas (blocks). Thus, for example, content management data can be acquired at a high speed at the start of an access to the recording medium and a menu screen can hence be displayed in a short period of time.

As described above, when a file serving as an object of the group management is added or updated, blocks of all files pertaining to a group including the added or updated file are each treated as an actually unusable block. Thus, since the number of blocks becoming unusable due to an operation to add or update a file can be reduced, the recording area of the recording medium 81 can be utilized effectively and, in addition, only the added or updated file needs to be newly recorded on the recording medium 81 while other files can be left as they are.

Figure 17:
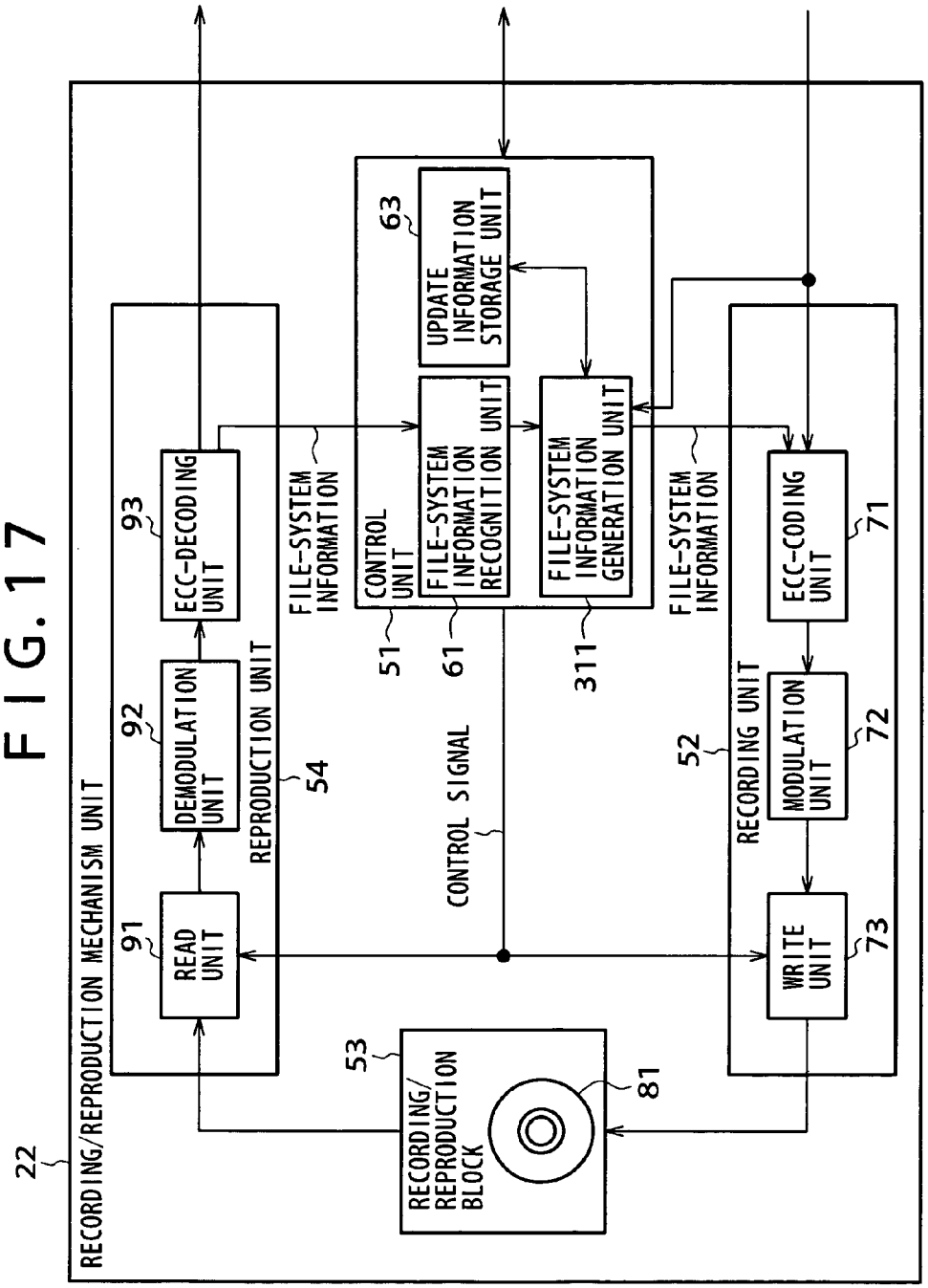
FIG. 17 is a diagram showing a further configuration of the recording/reproduction mechanism unit employed in the recording/reproduction apparatus shown in FIG. 1.

FIG. 17 is a diagram showing the configuration of a recording/reproduction mechanism unit 22 for newly recording only a changed file serving as an object of the group management and keeping the recording state of other files as it is when the file is added or updated. It is to be noted that configurations elements identical with their counterparts employed in the recording/reproduction mechanism unit 22 shown in FIG. 2 are denoted by the same reference numerals of the counterparts, and their descriptions are not repeated to avoid duplications.

The configuration of the recording/reproduction mechanism unit 22 shown in FIG. 17 is different from the configuration of the recording/reproduction mechanism unit 22 shown in FIG. 2 in that the recording/reproduction mechanism unit 22 shown in FIG. 17 employs a file-system information generation unit 311 serving as a substitute for the file-system information generation unit 62.

The file-system information generation unit 311 basically has the same function as the file-system information generation unit 62 except that, in the file-system information generation unit 311, when a file serving as an object of the group management is added or updated, only the changed file is stored in the update information storage unit 63, the write unit 73 is controlled to drive the recording/reproduction block 53 to newly record only the added or updated file onto the recording medium 81 and the recording state of other files can be left as it is.

It is to be noted that, since the file-system information generation unit 311 is capable of individually adding a file serving as an object of the group management or putting a file serving as an object of the group management in an unusable state, an added or updated file serving as an object of the group management is recorded on the recording medium 81 at a location not determined for the management group including the file. Thus, in order to read out the file serving as an object of the group management from the recording medium 81 at a high speed, it is necessary to carry out an optimization process for placing files in group units. In general, the optimization process is referred to as a de-fragmentation process.

Figure 18:
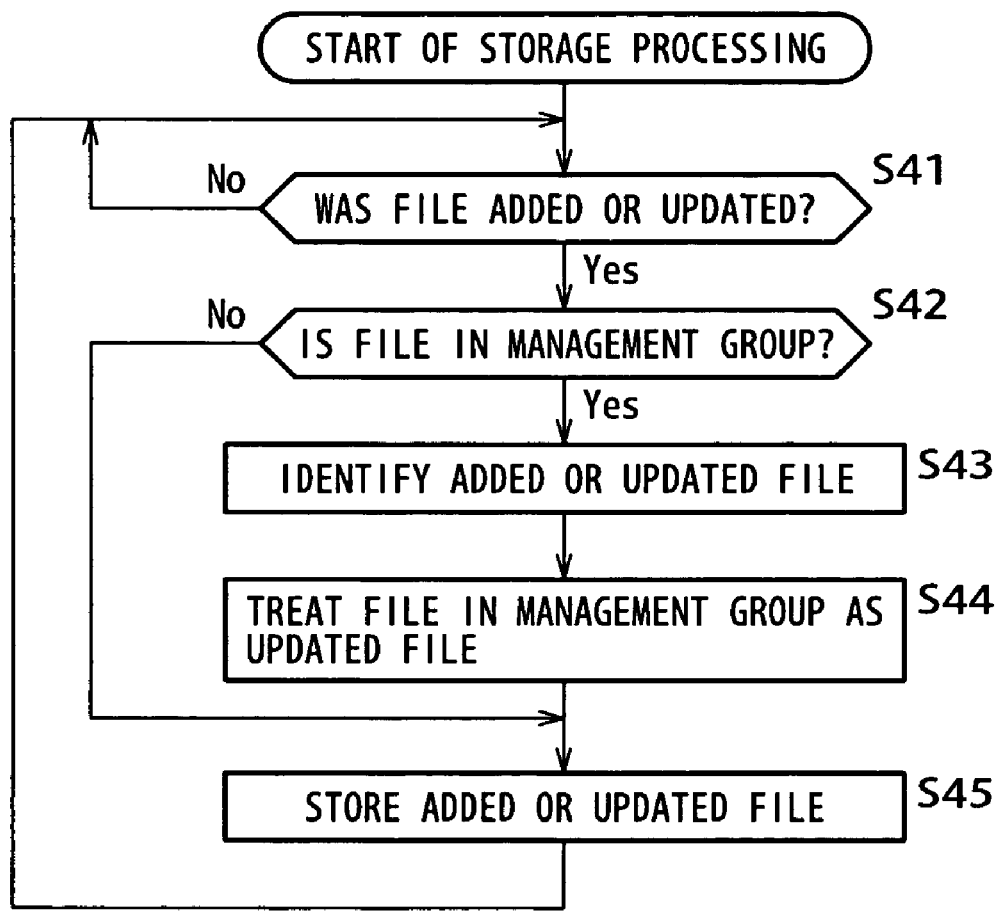
FIG. 18 shows a flowchart representing a process carried out by the recording/reproduction mechanism unit shown in FIG. 17 to store data.

Next, a data-storing process carried out by the recording/reproduction mechanism unit 22 shown in FIG. 17 is explained by referring to a flowchart shown in FIG. 18. It is to be noted that, since processes carried out at steps S41, S42 and S45 are the same as those performed at respectively the steps S1, S2 and S4 of the flowchart shown in FIG. 10, their descriptions are not repeated to avoid duplications.

At a step S43, the file-system information generation unit 311 confirms that a file has been added or updated.

Then, at the next step S44, the file-system information generation unit 311 stores the confirmation of the added or updated file in the update information storage unit 63.

By carrying out the above processing, when a file is added or updated, the fact that the file has been added or updated and information of the file are stored in the update information storage unit 63.

Figure 19:
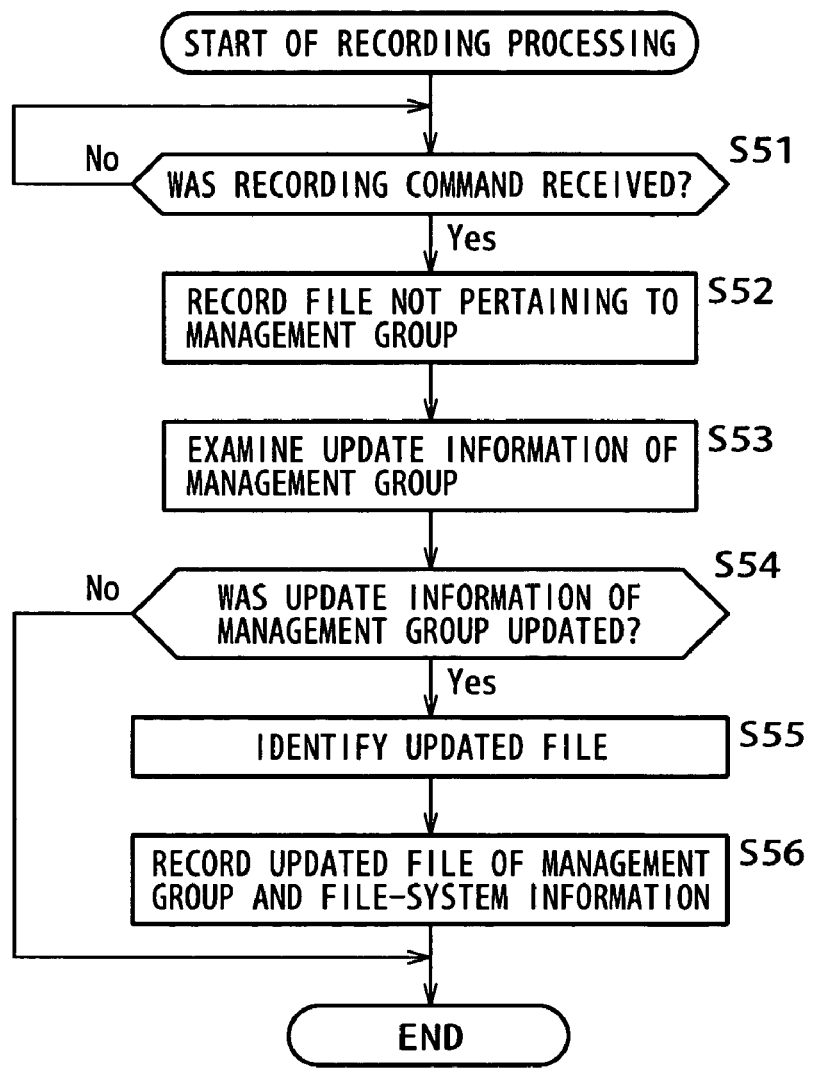
FIG. 19 shows a flowchart representing a process carried out by the recording/reproduction mechanism unit shown in FIG. 17 to store a file.

Next, a file-storing process carried out by the recording/reproduction mechanism unit 22 shown in FIG. 17 is explained by referring to a flowchart shown in FIG. 19. It is to be noted that, since processes carried out at steps S51 to S54 are the same as those performed at respectively the steps S1 to S4 of the flowchart shown in FIG. 11, their descriptions are not repeated to avoid duplications.

At a step S55, the file-system information generation unit 311 confirms that a file has been added or updated. Then, at the next step S56, the added or updated file serving as an object of the group management is read out from the update information storage unit 63 to be recorded onto the recording medium 81, and corresponding file-system information is generated also to be recorded on the recording medium 81 as well.

Figure 20:
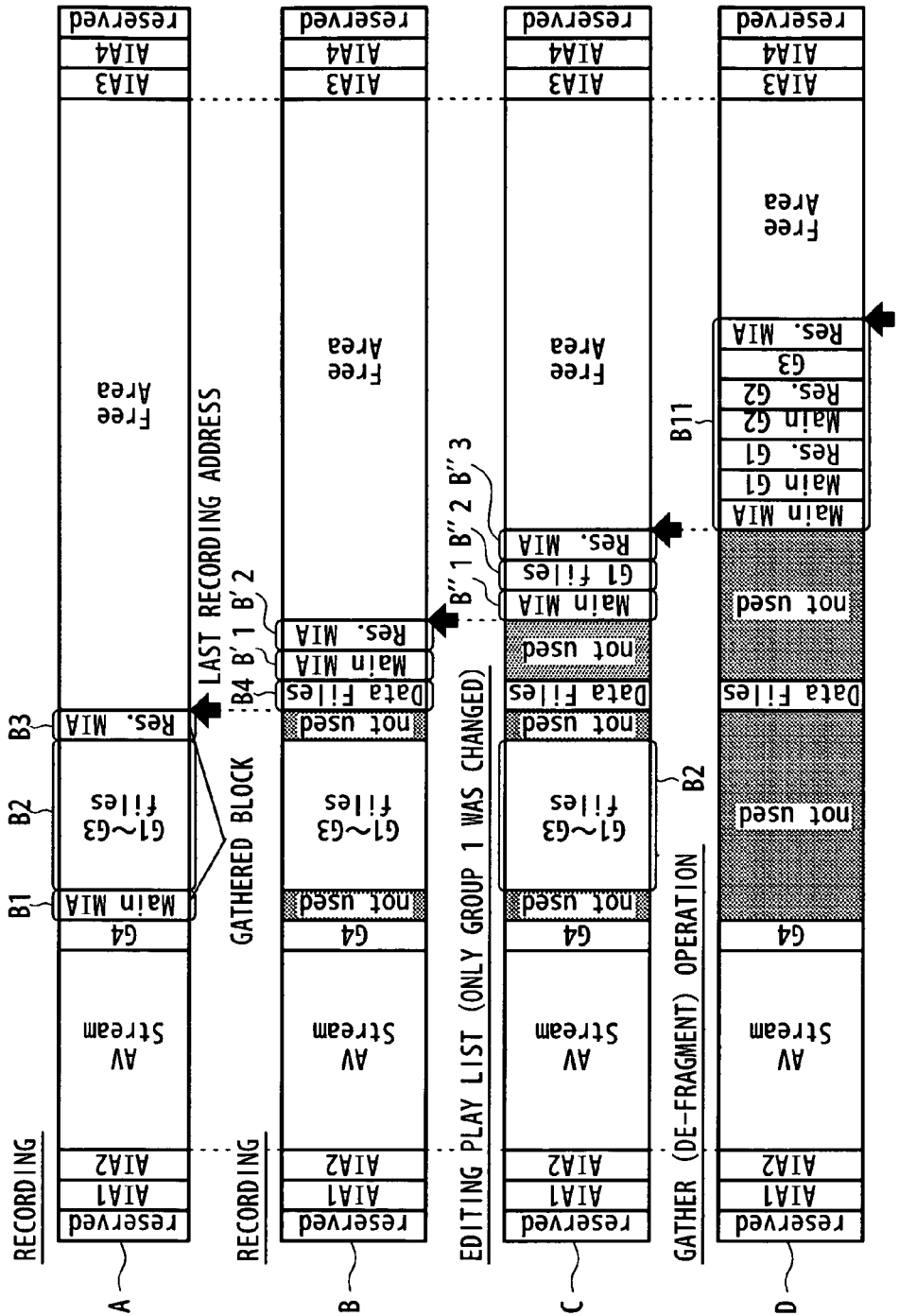
FIG. 20 is an explanatory diagram showing a recording process carried out by the recording/reproduction mechanism unit shown in FIG. 17.

That is to say, when an operation to edit a play list is carried out and, as a result, a file pertaining to group G1 is updated, for example, the processing performed at the step S56 changes the recording state of the recording medium 81 from state B to state C as shown in FIG. 20.

It is to be noted that, since state B shown in FIG. 20 is the same as state B shown in FIG. 12, its explanation is not repeated to avoid duplications. In state A shown in FIG. 12, Main G1, Res.G1, Main G2, Res.G2 and G3 form one block. In state A shown in FIG. 20, however, they can be managed separately in file units. Thus, files each serving as an object of the group management are recorded in block B2 but they are each put in a state of being not placed in group units. In the figure, they are shown as G1 to G3 files.

Due to the recording process carried out at the step S56, the Main MIA containing the file-system information is recorded in block B"1 at a location closest to block B'2 in a free area on the recording medium 81. Then, files pertaining to group 1 or group G1 including the added or updated file are recorded in block B"2. The files pertaining to group 1 or group G1 are shown as G1 files in the figure. Furthermore, Res.MIA for a backup of the file-system information is recorded in block B"3. Then, information recorded in the AIA as information on the locations of Main MIA and Res.MIA is updated to information pointing to blocks B"1 and B"3 respectively. As a result of the processing carried out as described above, a portion of block B2 used so far as a block for recording files each serving as an object of the group management as well as blocks B'1 and B'2 used for recording the immediately previous file-system information are put in an unreferenced state or shown as blocks in not-used areas in the figure. It is to be noted that, in the recording state shown in FIG. 20, an essential difference between block B2 in state A and block B2 in state C is not shown explicitly. In actuality, however, a portion included in block B2 as a portion corresponding to the added or updated file pertaining to group G1 is put in an unusable state. Thus, block B2 in state A actually has a size different from the size of block B2 in state C. In addition, as is obvious from FIG. 20, in the change from state A to state B and the change from state B to state C, newly recorded data and newly recorded file-system information are put in regions included in the free area as regions closest to an area used so far as an area for recording data as shown in the figure. It is to be noted, however, that the newly recorded data and the newly recorded file-system information can be actually recorded at any locations in the free area.

In accordance with the processing described above, when a file serving as an object of the group management is added or updated, the recording process can be completed by merely recording only the added or updated file itself and file-system information in new blocks. Thus, information of files pertaining to the management group but not serving as an object of file addition or file updating can be used thereafter as it is so that recording areas on the recording medium 81 can be used effectively.

As shown by state C of FIG. 20, however, block B2 for recording files each serving as an object of the group management and the added or updated file pertaining to group G1 are placed at different locations. In addition, the files each serving as an object of the group management are recorded at locations separated from each other in block B2. Thus, in order to read out the files each serving as an object of the group management at a high speed, a de-fragmentation process is carried out in state C to result in state D, in which files each to serve as an object of the group management are recorded in group units. That is to say, in state D, files pertaining to Main MIA, Main G1, Res.G1, Main G2, Res.G2, G3 and Res.MIA are placed in management-group units as shown in block B11.

As a result, since files each serving as an object of the group management are continuously recorded in group units in one block, by making an access to two blocks, the files each serving as an object of the group management can be read out continuously. The two blocks are the block for recording the files each serving as an object of the group management and a block for storing Res.MIA and Main MIA for recording file-system information. As a result, a high speed to read out files can be assured with a sufficiently high degree of reliability.

Figure 21:
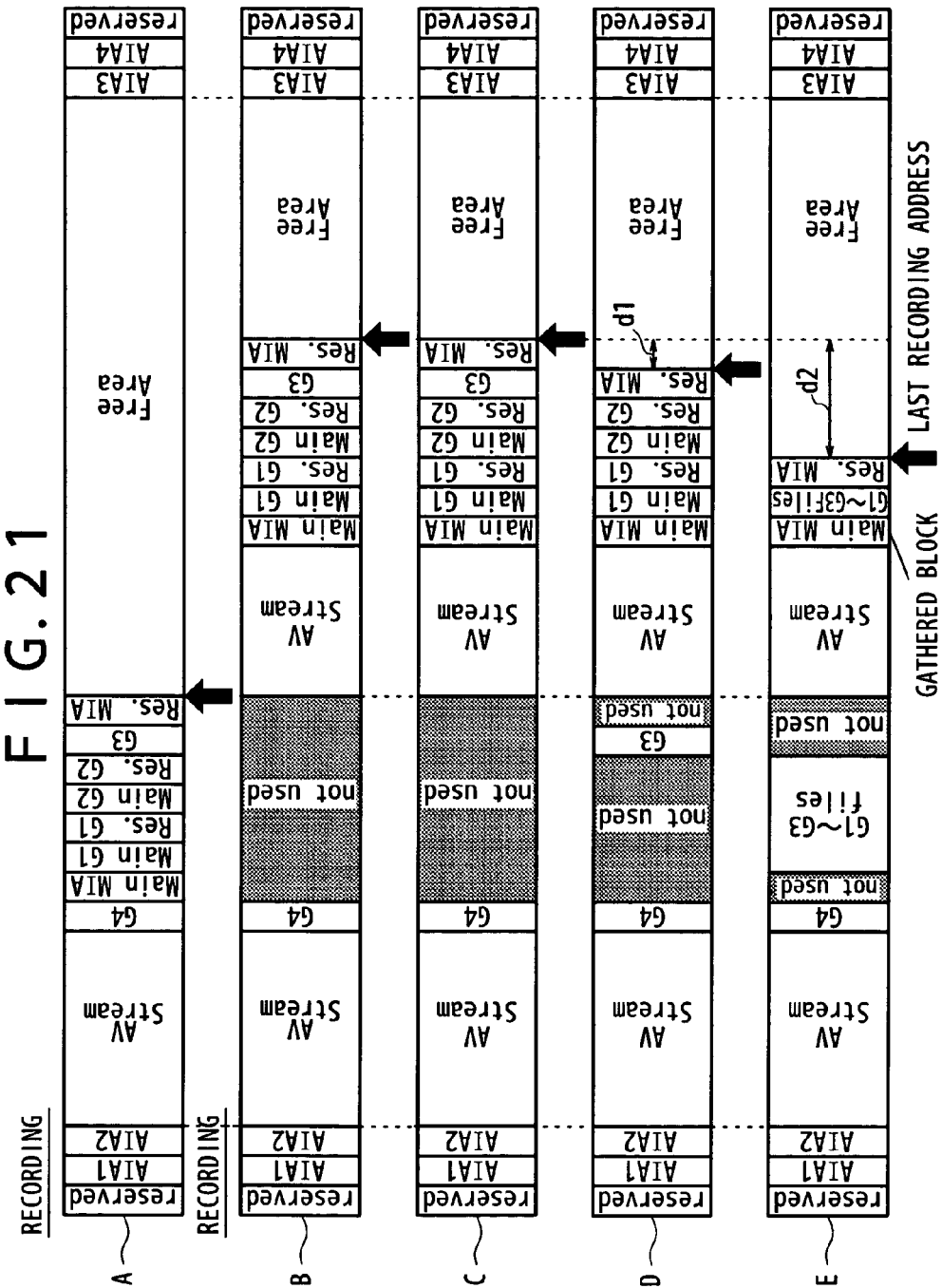
FIG. 21 is an explanatory diagram showing results of recording processes carried out by the recording/reproduction mechanism units shown in FIGS. 2, 13 and 17.

FIG. 21 is a diagram showing recording states existing on the recording medium 81 as a result of recording processes, which are carried out by the recording/reproduction mechanism units 22 shown in FIG. 2, 13 or 17 when an AV stream as well as files pertaining to management groups G1 and G2 are added and/or updated.

It is to be noted that, in FIG. 21, state A shown is a state existing on the recording medium 81 prior to the recording process and state B is a state resulting from the conventional recording process. State C is a state resulting from the recording process carried out by the recording/reproduction mechanism unit 22 shown in FIG. 2, state D is a state resulting from the recording process carried out by the recording/reproduction mechanism unit 22 shown in FIG. 13 and state E is a state resulting from the recording process carried out by the recording/reproduction mechanism unit 22 shown in FIG. 17.

That is to say, when an AV stream as well as files pertaining to management groups G1 and G2 are added and/or updated to result in the recording states shown in FIG. 21, as is obvious from states B and C, the recording process carried out by the recording/reproduction mechanism unit 22 shown in FIG. 2 is not different from the conventional recording process. However, comparison of state B with state D indicates that an area represented by reference notation d1 in the figure is saved. By the same token, comparison of state B with state E indicates that an area represented by reference notation d2 in the figure is saved. In the same way, comparison of state D with state E indicates that an area expressed by a difference (d2−d1) in the figure is saved.

As a result, when an AV stream as well as files pertaining to management groups G1 and G2 are added and/or updated to result in the recording states shown in FIG. 21, the recording process carried out by the recording/reproduction mechanism unit 22 shown in FIG. 17 allows the recording area of the recording medium 81 to be used with the highest degree of efficiency. The next efficient utilization is given by the recording/reproduction mechanism unit 22 shown in FIG. 13 and less efficient utilization is given by the recording/reproduction mechanism unit 22 shown in FIG. 2 in comparison with the recording/reproduction mechanism unit 22 shown in FIG. 17 and the recording/reproduction mechanism unit 22 shown in FIG. 13.

Figure 22:
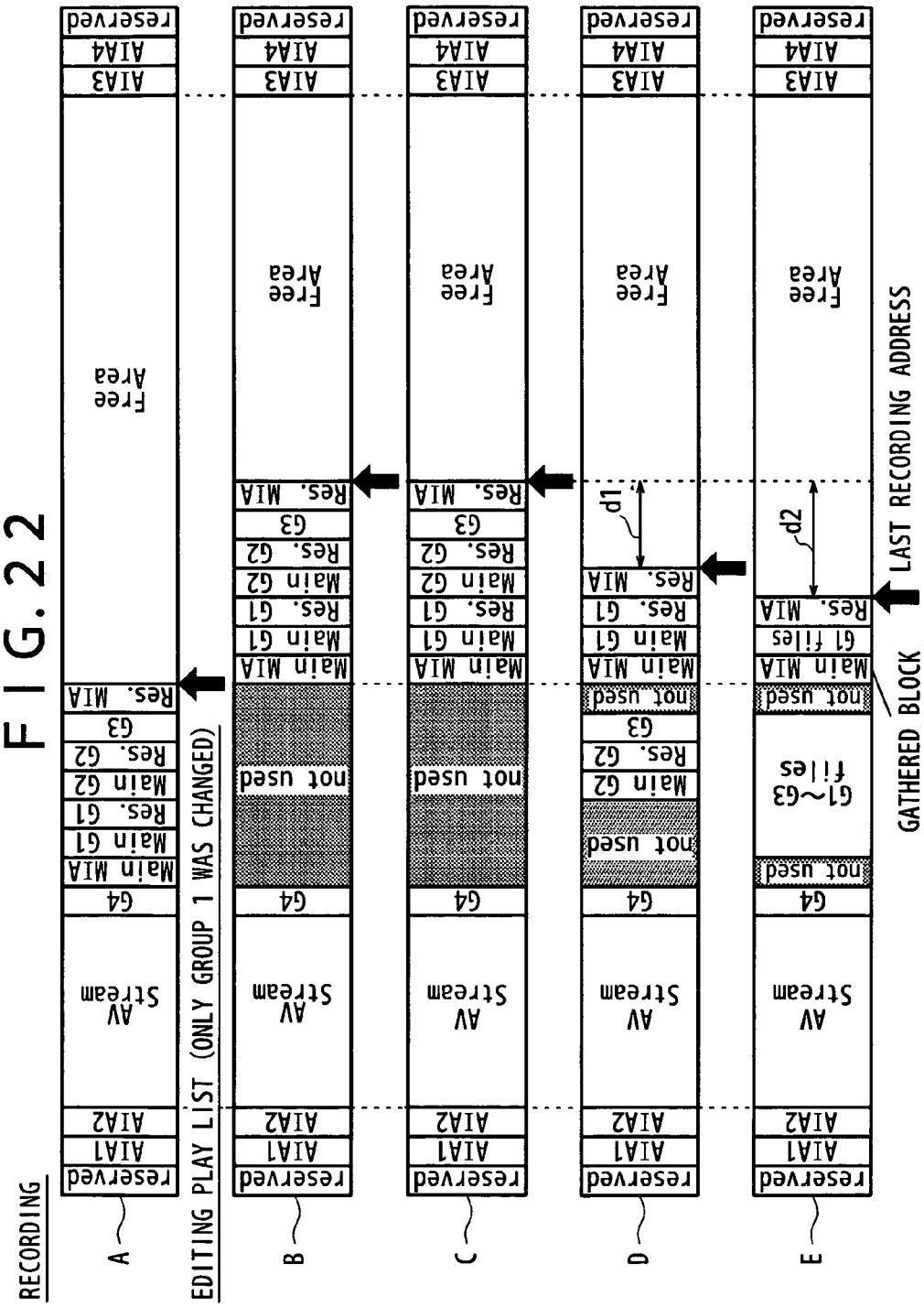
FIG. 22 is an explanatory diagram showing results of recording processes carried out by the recording/reproduction mechanism units shown in FIGS. 2, 13 and 17.

FIG. 22 is a diagram showing recording states existing on the recording medium 81 as a result of recording processes, which are carried out by the recording/reproduction mechanism units 22 shown in FIG. 2, 13 and 17 when a file pertaining to management group G1 is added or updated.

It is to be noted that, much like the recording states shown in FIG. 21, in FIG. 22, state A shown is a state existing on the recording medium 81 prior to the recording process and state B is a state resulting from the conventional recording process.

State C is a state resulting from the recording process carried out by the recording/reproduction mechanism unit 22 shown in FIG. 2, state D is a state resulting from the recording process carried out by the recording/reproduction mechanism unit 22 shown in FIG. 13 and state E is a state resulting from the recording process carried out by the recording/reproduction mechanism unit 22 shown in FIG. 17.

That is to say, when a file pertaining to management group G1 and G2 is added or updated to result in the recording states shown in FIG. 22, as is obvious from states B and C, the recording process carried out by the recording/reproduction mechanism unit 22 shown in FIG. 2 is not different from the conventional recording process. However, comparison of state B with state D indicates that an area represented by reference notation d1 in the figure is saved. By the same token, comparison of state B with state E indicates that an area represented by reference notation d2 in the figure is saved. In the same way, comparison of state D with state E indicates that an area expressed by a difference (d2–d1) in the figure is saved.

As a result, when a file pertaining to management groups G1 is added or updated to result in the recording states shown in FIG. 22, the recording process carried out by the recording/reproduction mechanism unit 22 shown in FIG. 17 allows the recording area of the recording medium 81 to be used with the highest degree of efficiency. The next efficient utilization is given by the recording/reproduction mechanism unit 22 shown in FIG. 13 and less efficient utilization is given by the recording/reproduction mechanism unit 22 shown in FIG. 2 in comparison with the recording/reproduction mechanism unit 22 shown in FIG. 17 and the recording/reproduction mechanism unit 22 shown in FIG. 13.

Figure 23:
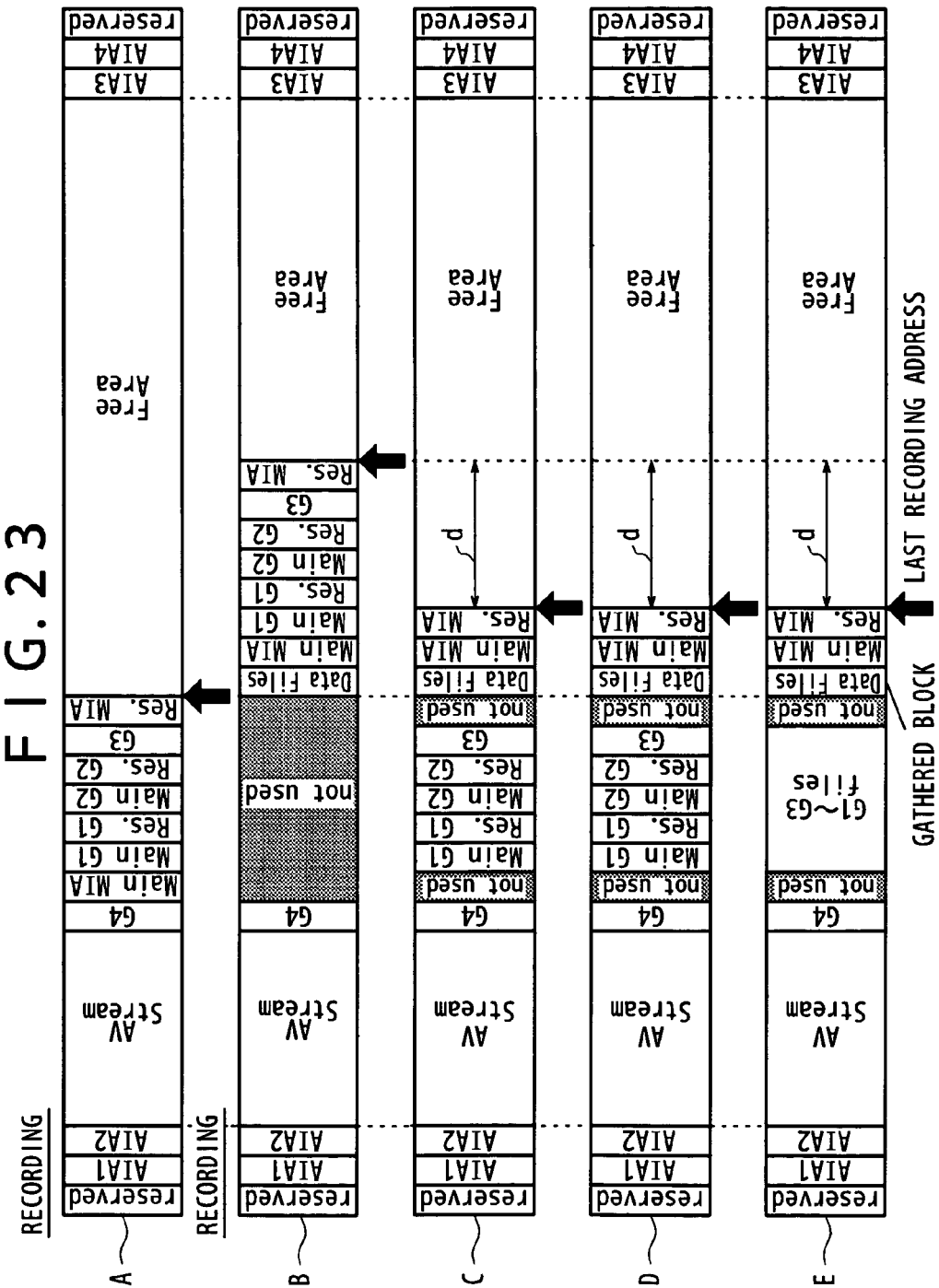
FIG. 23 is an explanatory diagram showing results of recording processes carried out by the recording/reproduction mechanism units shown in FIGS. 2, 13 and 17.

FIG. 23 is a diagram showing recording states existing on the recording medium 81 as a result of processes, which are carried out by the recording/reproduction mechanism units 22 shown in FIG. 2, 13 and 17 when a file not serving as an object of the group management is added or updated.

It is to be noted that, much like the recording states shown in FIG. 21, in FIG. 23, state A shown is a state existing on the recording medium 81 prior to the recording process and state B is a state resulting from the conventional recording process. State C is a state resulting from the recording process carried out by the recording/reproduction mechanism unit 22 shown in FIG. 2, state D is a state resulting from the recording process carried out by the recording/reproduction mechanism unit 22 shown in FIG. 13 and state E is a state resulting from the recording process carried out by the recording/reproduction mechanism unit 22 shown in FIG. 17.

That is to say, when a file not serving as an object of the group management is added and/or updated to result in the recording states shown in FIG. 23, as is obvious from states B to E, any of the recording processes carried out by the recording/reproduction mechanism units 22 shown in FIGS. 2, 13 and 17 saves an area represented by reference notation d in the figure.

As a result, when a file not serving as an object of the group management is added or updated to result in the recording states shown in FIG. 23, any of the recording processes carried out by the recording/reproduction mechanism units 22 shown in FIGS. 2, 13 and 17 allows the recording area of the recording medium 81 to be used with a high degree of efficiency.

As shown in FIGS. 21 to 23, any of the recording processes carried out by the recording/reproduction mechanism units 22 shown in FIGS. 2, 13 and 17 allows the recording area of the recording medium 81 to be used with a high degree of efficiency. In addition, since any of the recording processes allows files each serving as an object of the group management to be recorded continuously in group units on the recording medium 81, the files each serving as an object of the group management can be read out at a high speed.

As described above, when the recording/reproduction mechanism unit 22 adds or changes a file, file-system information and the added or changed file are recorded in new areas on the recording medium 81 in a process using the recording area of the recording medium 81 with a high degree of efficiency.

By the way, by carrying out processing like the one described above, an added or modified file stored in a recording area is recorded in a new area on the recording medium 81 and the information contained in the file prior to the addition or the modification is put in unusable status even though the file itself is left in the recording area.

When an attempt is made to read out an added or changed latest file recorded in a new area from the new area, the attempt may end in a failure due to file-system information damaged by a bad state such as a defective sector existing on the recording medium 81. In this case, the damaged file-system information can be conceivably recovered by reading out previous file-system information put in an unusable state as a substitute for the damaged one.

Figure 24:
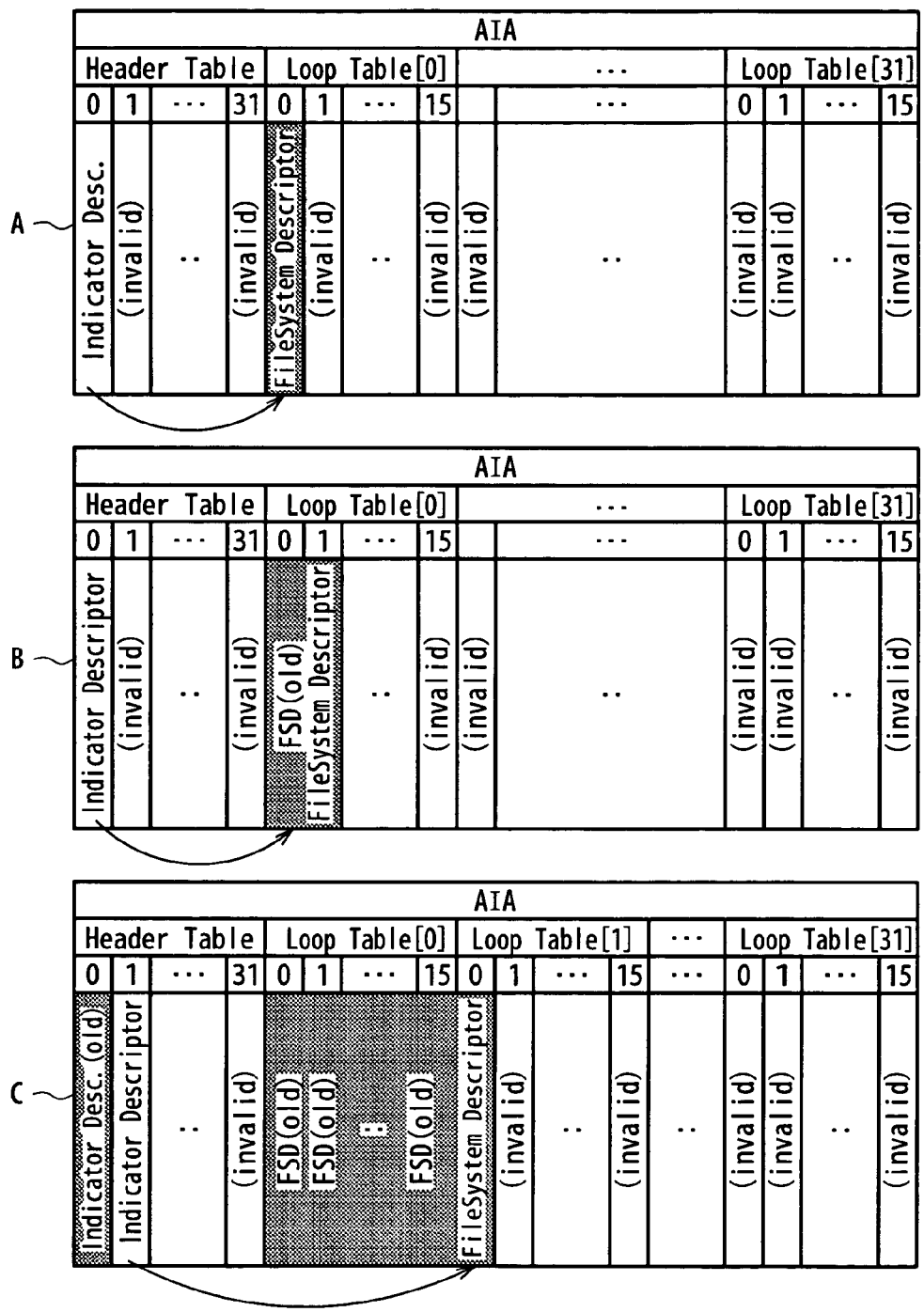
FIG. 24 is an explanatory diagram showing configurations of an AIA.

In order to implement the scheme described above, a recording/reproduction mechanism unit 22 is explained in the following description as a unit for recovering damaged file-system information by reading out previous file-system information in an unusable state as a substitute for the damaged one in case an attempt made to read out the damaged one ends in a failure. Prior to the description, however, the configuration of the AIA is explained by referring to FIG. 24. The AIA is used for managing locations of file-system information. It is to be noted that FIG. 24 is a diagram showing states of the AIA. States A, B and C shown in the figure are a state series through which the AIA changes sequentially.

As described above, in the BDFS, the location of file-system information (MIA) can be changed every time data is recorded onto the recording medium. At that time, information recorded in the AIA as information on the location and size of the MIA is updated.

As shown in FIG. 24, the inside of the AIA has a structure of two layers, i.e., a header-table layer and a layer of loop tables. An indicator descriptor in the header table includes the number of loop tables in the AIA, the number of renewal blocks in an effective loop table and the table number of the presently effective loop table. As shown in FIG. 24, the indicator descriptor comprises 32 indicator-descriptor renewal blocks allowing the indicator descriptor to be renewed with new descriptions 32 times.

A file system descriptor in each loop table describes the location and size of a main MIA as well as the location and size of a reserved MIA. The file system descriptor is updated every time the recording location of the MIA is changed.

When the MIA is updated, for example, the AIA changes from state A to state B as shown in FIG. 24, and a new file system descriptor is recorded in the next renewal block in the loop table. That is to say, as shown in FIG. 24, in state A, the file system descriptor (FSD) is recorded in an FSD renewal block included in a loop table with a table number of 0 as a block having a block number of 0. In the figure, the loop table with a table number of 0 is shown as a loop table [0].

Figure 25:
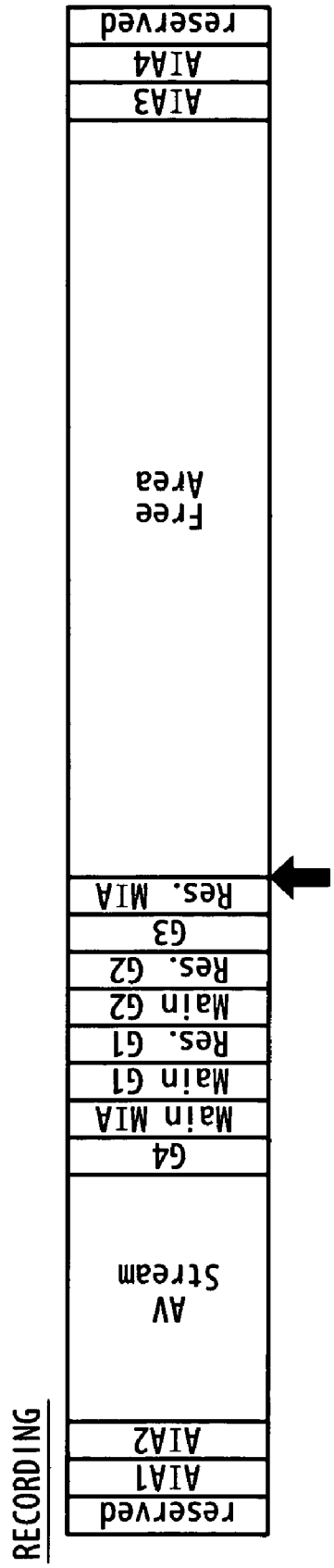
FIG. 25 is an explanatory diagram showing configurations of the AIA.

This state typically corresponds to a recording state existing on the recording medium 81 as a state shown in FIG. 25. MIA information shown in FIG. 25 is described in the FSD in state A shown in FIG. 24. As described above, the FSD is recorded in an FSD renewal block included in a loop table with a table number of 0, that is, a loop table [0], as a block having a block number of 0.

Figure 26:
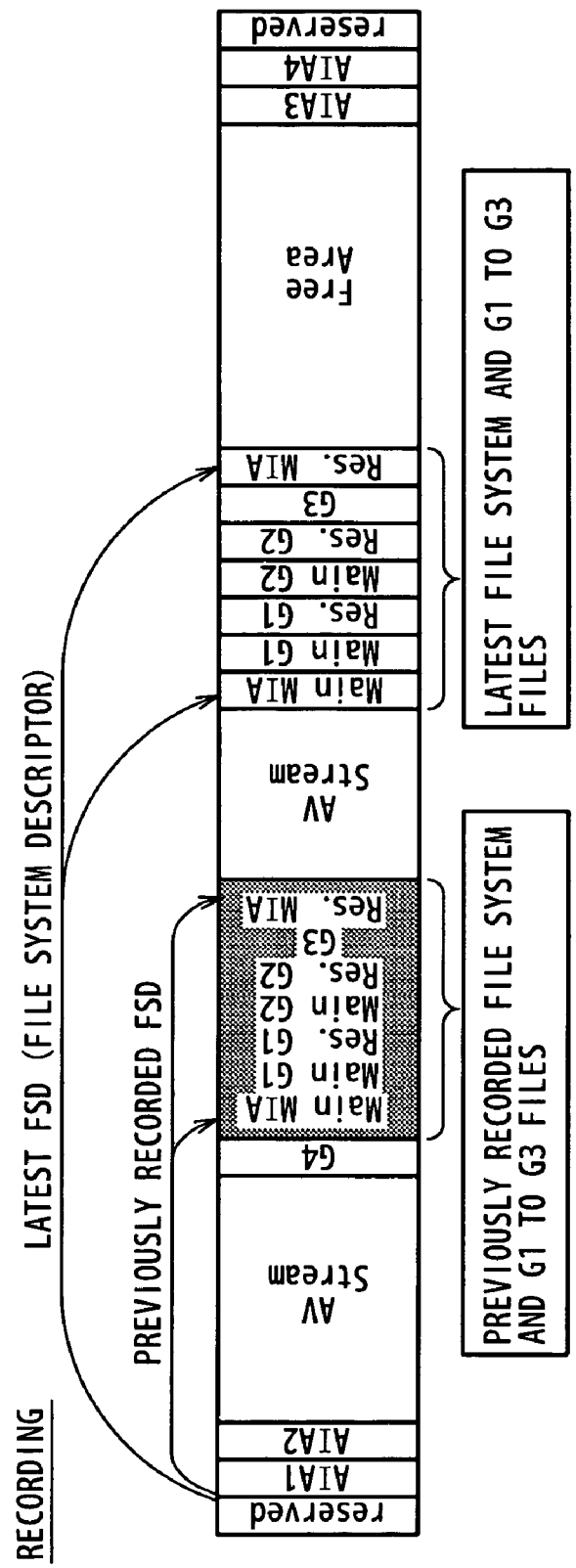
FIG. 26 is an explanatory diagram showing configurations of the AIA.

In this state, when an AV stream as well as files pertaining to management groups G1 and G2 as files each serving as an object of the group management are added, in accordance with the recording/reproduction mechanism unit 22 shown in FIG. 2, as shown in FIG. 26, at the beginning position of the free area, an AV stream is recorded to be followed sequentially by Main MIA, Main G1, Res.G1, Main G2, Res.G2, G3 and Res.MIA.

When the recording state of the recording medium 81 changes from the state shown in FIG. 25 to one shown in FIG. 26, the MIA is updated. Thus, the AIA changes from state A to state B and a new FSD is recorded in an FSD renewal block having a block number of 1 in a loop table having a table number of 0. As described above, the loop table having a table number of 0 is shown as a loop table [0] in the figure.

By carrying out such processing, the FSD can be renewed 16 times by being recorded in FSD renewal blocks having block numbers of 0 to 15 in the loop table having a table number of 0 sequentially from one block to another. When the FSD is renewed, information of the pre-renewal FSD is left as it is in a previous FSD renewal block used so far for storing the FSD. The information of the pre-renewal FSD is shown as an FSD (old) in the figure, and the previous FSD renewal block is put in an unusable state because only an FSD renewal block for recording the latest FSD will serve as an object of search processing. As the MIA is updated repeatedly, the last FSD renewal block, that is, an FSD renewal block with a block number of 15, is used. Then, when the MIA is updated again, a new FSD is described in the first FSD renewal block of the next loop table as shown in FIG. 24. The next loop table is a loop table [1] shown in FIG. 24.

Thus, the table number assigned to the currently effective loop table changes. Accordingly, an indicator-descriptor renewal block indicated by the next number in the header table shown in FIG. 24 is used as a block for describing new contents of the indicator descriptor.

As is obvious from FIG. 24, 32 loop tables can be used, and each of the loop tables includes 16 FSD renewal blocks each used for describing a file system descriptor. Thus, the file system descriptor can be updated up to 512 times. That is to say, the MIA can be moved up to 512 times.

As described above, in the AIA, the locations of the MIAs are described. Thus, file-system information is acquired by analyzing the main MIA and the reserved MIA, the locations of which are recognized from the latest FSD described in the AIA.

Next, by referring to FIG. 27, a recording/reproduction mechanism unit 22 is explained in the following description as a unit for recovering damaged file data by reading out previous file data in an unusable state as a substitute for the damaged one in case an attempt made to read out the damaged one ends in a failure. It is to be noted that, in FIG. 27, configuration elements identical with counterparts employed in the recording/reproduction mechanism unit 22 shown in FIG. 2 are denoted by the same reference numeral as the counterparts, and their descriptions are not repeated to avoid duplications.

Figure 27:
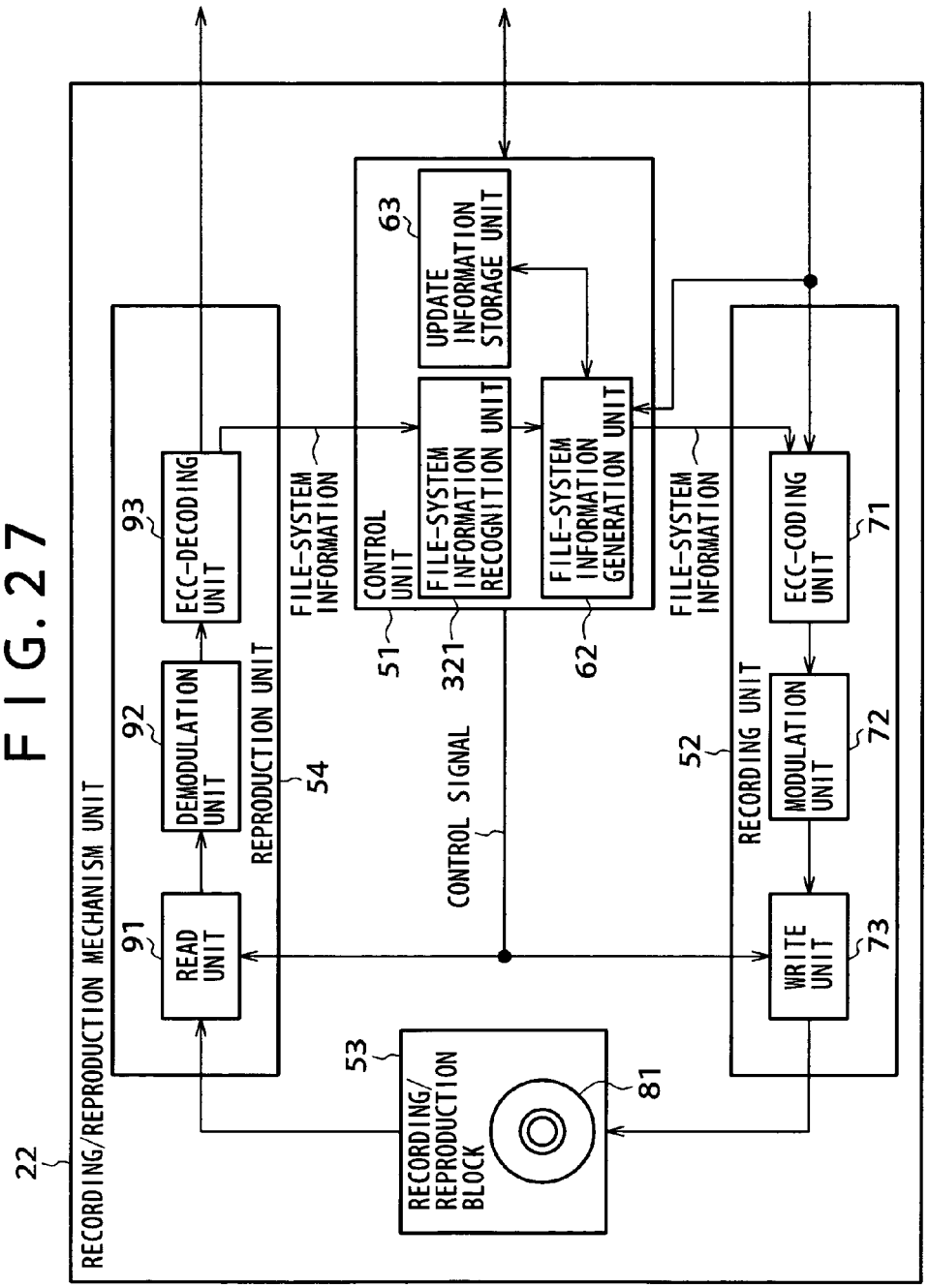
FIG. 27 is a diagram showing a still further configuration of the recording/reproduction mechanism unit employed in the recording/reproduction apparatus shown in FIG. 1.

The recording/reproduction mechanism unit 22 shown in FIG. 27 is different from the configuration of the recording/reproduction mechanism unit 22 shown in FIG. 2 in that the recording/reproduction mechanism unit 22 shown in FIG. 27 employs a file-system information recognition unit 321 serving as a substitute for the file-system information recognition unit 61.

Basically, the file-system information recognition unit 321 has the same configuration as the file-system information recognition unit 61 except that, in the file-system information recognition unit 321, in addition to the function to control the read unit 91 to read out file-system information and management data from the recording medium 81, in case the file-system information and the management data cannot be read out from the recording medium 81 due to a defective sector or the like, the AIA is analyzed and, on the basis of information in an FSD recorded previously as an FSD immediately preceding the latest FSD, file-system information and management data are read out from the recording medium 81. If file-system information and management data still cannot be read from the recording medium 81, the operations to analyze preceding FSD and to read out file-system information as well as management data from the recording medium 81 are repeated. The operations to analyze preceding FSD and to read out file-system information as well as management data from the recording medium 81 are carried out repeatedly till file-system information and management data can be acquired from the recording medium 81. In this way, the latest possible file-system information can be recovered.

Figure 28:
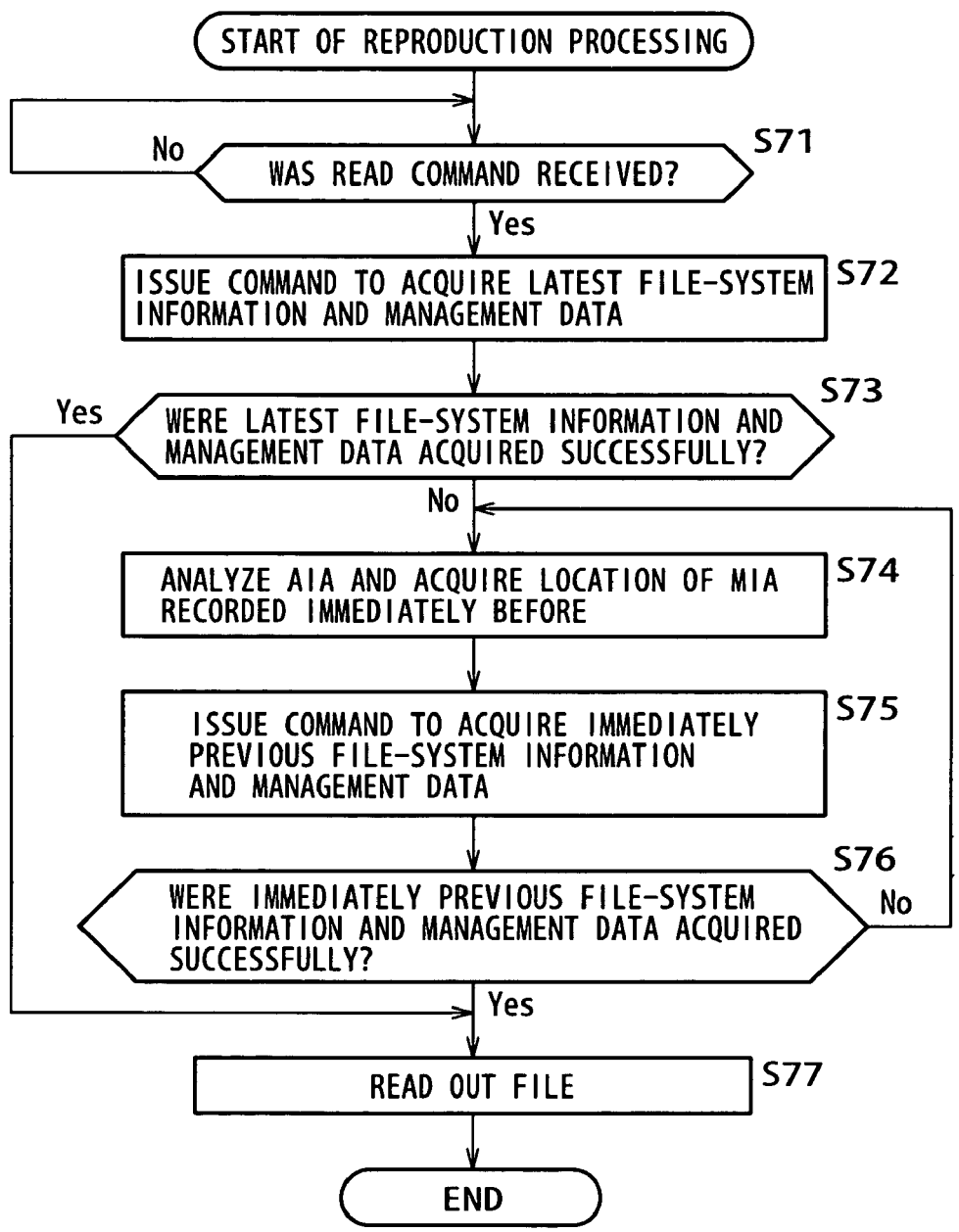
FIG. 28 shows a flowchart representing a reproduction process carried out by the recording/reproduction mechanism unit shown in FIG. 27.

By referring to a flowchart shown in FIG. 28, the following description explains reproduction processing carried out by the recording/reproduction mechanism unit 22 shown in FIG. 27 to reproduce (read out) information, which was recorded onto the recording medium 81 by the recording/reproduction mechanism unit 22 shown in FIG. 2, from the recording medium 81.

The flowchart begins with a step S71 at which the file-system information recognition unit 321 determines whether or not a command to read out a file has been received. If a result of determination indicates that no command to read out a file has been received, the execution of the step is repeated. The step is executed repeatedly till a command to read out a file is received. As the result of determination obtained at the step S71 indicates that a command to read out a file has been received, the flow of the processing goes on to a step S72 at which the read unit 91 is controlled to drive the recording/reproduction block 53 to acquire latest file-system information and latest management data on the basis a latest MIA obtained from a latest FSD included in the AIA recorded on the recording medium 81. For example, let state B shown in FIG. 24 be the state of the AIA. In this case, a command is given to the recording/reproduction block 53 to read out an indicator descriptor from an indicator-descriptor renewal block included in the header table of the AIA as an indicator-descriptor renewal block having a block number of 0, fetch a latest FSD from an FSD renewal block, which is included in a loop table indicated by the indicator descriptor as a table having a table number of 0, and acquire latest file-system information and latest management data on the basis of a latest MIA obtained from the latest FSD. The FSD renewal block is an FSD renewal block having a block number of 1.

Then, at the next step S73, the file-system information recognition unit 321 determines whether or not latest file-system information and latest management data have been acquired successfully. For example, let the recording medium 81 be in a state like the one shown in FIG. 26. In this case, main and reserved MIAs shown as areas in a white color on the right side in the figure correspond to latest file-system information and latest management data, which are to be acquired. Assume that a defective sector exists in these areas so that Main MIA and Res.MIA shown on the right side in the figure cannot be read out from the recording medium 81. In this case, the determination result obtained at the step S73 indicates that latest file-system information and latest management data cannot be acquired successfully, causing the flow of the processing to go on to a step S74.

At the step S74, the file-system information recognition unit 321 controls the read unit 91 to drive the recording/reproduction block 53 to acquire immediately previous file-system information and immediately previous management data on the basis of an immediately previous MIA obtained from an immediately previous FSD included in the AIA recorded on the recording medium 81.

In this case, since the AIA is in state B, the file-system information recognition unit 321 acquires immediately previous file-system information and immediately previous management data as follows. A command is given to the recording/reproduction block 53 to read out an indicator descriptor from an indicator-descriptor renewal block included in the header table of the AIA as an indicator-descriptor renewal block having a block number of 0, fetch an immediately more previous FSD than the latest FSD from an FSD renewal block, which is included in a loop table indicated by the indicator descriptor as a table having a table number of 0, and acquire information on the positions of immediately previous file-system information and immediately previous management data on the basis an immediately previous MIA obtained from the immediately previous FSD. The FSD renewal block is an immediately previous FSD renewal block having a block number of 0.

Then, at the next step S75, on the basis of the acquired information on the positions of immediately previous file-system information and immediately previous management data, the file-system information recognition unit 321 controls the read unit 91 to drive the recording/reproduction block 53 to acquire the immediately previous file-system information and the immediately previous management data from the recording medium 81.

That is to say, since the recording medium 81 is in the state shown in FIG. 26, on the basis of the acquired information on the positions of immediately previous file-system information and immediately previous management data, the file-system information recognition unit 321 controls the read unit 91 to drive the recording/reproduction block 53 to acquire the main and reserved MIAs shown as areas in the black color on the left side in FIG. 26 from the recording medium 81.

Then, at the next step S76, the file-system information recognition unit 321 determines whether or not the immediately previous file-system information and the immediately previous management data have been acquired successfully from the main and reserved MIAs on the recording medium 81. If the immediately previous file-system information and the immediately previous management data have been acquired successfully, the flow of the processing goes on to a step S77 at which the read unit 91 is controlled to drive the recording/reproduction block 53 to read out a desired file from the recording medium 81 on the basis of the immediately previous file-system information and the immediately previous management data.

If the determination result produced at the step S76 indicates that the immediately previous file-system information and the immediately previous management data were not acquired, on the other hand, the flow of the processing goes back to the step S74 to repeat the processes of the steps S74 to S76 described above. These processes are carried out repeatedly till previous file-system information and previous management data are acquired. That is to say, the processes are carried out repeatedly till latest possible file-system information and latest possible management data, which were used in the past, are acquired.

If the determination result produced at the step S73 indicates that the latest file-system information and the latest management data have been acquired successfully, on the other hand, the processes of the steps S74 to S76 are skipped.

By carrying out the processing described above, an attempt to acquire previous file-system information and previous management data is made repeatedly till latest possible file-system information and latest possible management data are obtained. Thus, even if the recording/reproduction mechanism unit 22 enters a state in which the latest file-system information and the latest possible management data cannot be obtained due to a defective sector existing on the recording medium 81, the latest file-system information and the latest management data can be recovered by using latest possible file-system information and latest possible management data.

In particular, in the case of WriteOnce recording media used as the recording medium 81, previous file-system information and previous management data can be acquired. Thus, the WriteOnce recording media can be restored to a state in which most data recorded thereon can be used. WriteOnce recording media is a recording medium allowing data to be recorded thereon only once. In addition, as is obvious from the AIA structure shown in FIG. 24, the location and size of each MIA recorded on the recording medium 81 so far can be obtained. Thus, pieces of recorded information can be read out sequentially till file-system information and management data are acquired. Thus, even if a defective sector exists on the recording medium 81, latest possible file-system information and latest possible management data can be acquired.

It is to be noted that the recording medium 81 is not limited to the WriteOnce media. For example, the recording medium 81 can be repeatedly renewable media for which the function to acquire latest possible file-system information and latest possible management data as described above can be implemented. This is because, by providing the recording/reproduction mechanism unit 22 of FIG. 2 as a unit for carrying out the recording process as described before, for every recording operation, recording locations of file-system information and management data are managed so as not to coincide with their previous recording locations.

The above description explains a case in which information has been recorded on the recording medium 81 in a recording process carried out by the recording/reproduction mechanism unit 22 shown in FIG. 2. However, the function to acquire latest possible file-system information and latest possible management data can also be applied to a case in which information has been recorded on the recording medium 81 in a recording process carried out by the recording/reproduction mechanism unit 22 shown in FIG. 13 or 17. This is because, since information recorded in the AIA is the same for all the cases, the same technique can be adopted to implement the function.

It is to be noted that, while the above description explains a case of using a recording medium 81 with only one recording layer, the above description also holds true of a case in which a file system, which is characterized in that recorded files are collected in groups and a specific rule is established for each of the groups, can also be used in a recording medium having a number of recording layers. For example, FIG. 29 is a diagram showing a recording medium having four recording layers to which the BDFS is applied.

In a recording medium having a number of recording layers, the recording direction on an odd-numbered recording layer is a direction from an inner circumference to an outer circumference on the recording medium, but the recording direction on an even-numbered recording layer is a direction from an outer circumference to an inner circumference on the recording medium. For example, in the case of the multi-layer recording medium shown in FIG. 29, on the first recording layer, data is recorded in a direction from a start address to an outer reserved area through a sequence consisting of an inner reserved area, AIA1, AIA2, an AV stream, AIA3 and AIA4. On the second recording layer on the other hand, data is recorded in a direction through a sequence consisting of an AV stream, Main MIA, Main G1, Res.G1, Main G2, Res.G2, G3 and Res.MIA. The third recording layer is a free area in which no data is recorded. At the end address on the fourth recording layer, only a reserved area is provided.

It is to be noted that the AIA exists only on the first recording layer. However, an MIA or a file serving as an object of the group management can be provided on any recording layer.

As is obvious from the above description, a file recorded on a recording medium as a file serving as an object of the group management can be read out from the recording medium at a high speed, and the recording area of the recording medium can be used effectively. In addition, even if latest file-system information and latest management data cannot be read out from the recording medium due to a defective sector existing on the recording medium or due to other causes, latest possible file-system information and latest possible management data can be recovered.

The series of processes described above can be carried out by using hardware or software. If the processes are carried out by using software, programs composing the software are installed in a computer embedded in a special-purpose hardware or installed in a general-purpose computer from a program-recording medium. A general-purpose computer is a computer capable of carrying out a variety of functions by executing a variety of programs installed in the computer. An example of the general-purpose computer is a general-purpose personal computer.

A program-recording medium is a medium for recording programs in advance as programs to be installed in a computer described above. The program-recording medium is distributed to the user separately from the information-recording/reproduction apparatus 1 for presenting the programs recorded thereon to the user. As shown in FIG. 1, the program-recording medium is package media, which can be a magnetic disc 41 including a flexible disc, an optical disc 42 including a CD-ROM (Compact Disc-Read Only Memory) and a DVD (Digital Versatile Disk), a magneto-optical disc 43 including an MD (Mini Disc) or a semiconductor memory 44. Instead of installing programs from the program-recording medium, the programs can be presented to the user as programs recorded in advance in a recording medium embedded in the information-recording/reproduction apparatus 1. Examples of the embedded recording medium are the ROM 12 and a hard disc incorporated in the storage unit 18.

It is to be noted that, in this specification, steps composing a program recorded in the program-recording medium or the embedded recording medium can of course be executed sequentially along the time axis in an order the steps are prescribed in the program as sequential processes. However, the steps do not have to be executed as sequential processes along the time axis, but can also be executed as processes carried out concurrently or individually.

In addition, in this specification, a system represents a complete apparatus comprising a plurality of apparatus.

What is claimed is:

1. An information-recording apparatus, comprising:
  a recording unit configured to record a file onto a recording medium, the recording medium including a first region of gathered files, the first region of gathered files including a plurality of group file area regions; and
  a control unit including a processor configured to
    group files into group units on the basis of attribute information, said attribute information including a use frequency of each file, a size of each file, and data indicating whether or not each file is used in a specific application operation,
    control said recording unit to record each of said group units onto one of the plurality of group file area regions of the first region of gathered files, and,
    when a file having attribute information associated with one of the group units is added or updated, update said one of the group units to include the added or updated file and control said recording unit to contiguously record said updated one of the group units on said recording medium as a new group unit in a group file area region of a second region of gathered files, the second region of gathered files located at an entirely non-overlapping different position on said recording medium than the first region of gathered files.

2. The information-recording apparatus according to claim 1, wherein
  said control unit recognizes an allocation class of a file as said attribute information of said file and groups files on the basis of allocation classes of said files.

3. The information-recording apparatus according to claim 1, wherein,
  when files having attribute information associated with group units are added or updated, said control unit updates said group units with the added or updated files and controls said recording unit to contiguously record said updated group units on said recording medium as new group units in respective group file area regions of the second region of gathered files on said recording medium.

4. The information-recording apparatus according to claim 1, wherein,
  when said one of the group units has been added or updated, said control unit updates file-system information and controls said recording unit to contiguously record said updated file-system information collectively with said new group unit in the second region of gathered files on said recording medium.

5. The information-recording apparatus according to claim 4, further comprising:
  a read unit configured to read out file-system information recorded on said recording medium in group units from said recording medium, wherein,
  when an operation to read out re-recorded file-system information ends in a failure, said read unit reads out previously-recorded file-system information corresponding to said re-recorded file-system information from an area storing said previously-recorded file-system information before re-recording said previously-recorded file system information in place of unreadable file-system information.

6. The information-recording apparatus according to claim 1, wherein,
  when a file has been added or updated, said control unit controls said recording unit to newly record specific files on said recording medium, after a predetermined command is issued.

7. The information-recording apparatus according to claim 1, wherein
  said control unit controls said recording unit to record said grouped files in group units collectively in a contiguous area of said recording medium.

8. An information-recording method for recording onto a recording medium, the recording medium including a first region of gathered files, the first region of gathered files including a plurality of group file area regions, comprising:

grouping files into group units on the basis of attribute information, said attribute information including a use frequency of each file, a size of each file, and data indicating whether or not each file is used in a specific application operation;

recording each of said group units onto one of the plurality of group file area regions of the first region of gathered files; and, when a file having attribute information associated with one of the group units is added or updated, updating said one of the group units to include the added or updated file and contiguously recording said updated one of the group units on said recording medium as a new group unit in a group file area region of a second region of gathered files, the second region of gathered files located at an entirely non-overlapping different position on said recording medium than the first region of gathered files.

9. A computer readable storage medium including a program that, when executed by a processor of a computer, directs the computer to carry out an information-recording method for recording onto a recording medium, the recording medium including a first region of gathered files, the first region of gathered files including a plurality of group file area regions, comprising:

grouping files into group units on the basis of attribute information, said attribute information including a use frequency of each file, a size of each file, and data indicating whether or not each file is used in a specific application operation;

recording each of said group units onto one of the plurality of group file area regions of the first region of gathered files; and, when a file having attribute information associated with one of the group units is added or updated, updating said one of the group units to include the added or updated file and contiguously recording said updated one of the group units on said recording medium as a new group unit in a group file area region of a second region of gathered files, the second region of gathered files located at an entirely non-overlapping different position on said recording medium than the first region of gathered files.

10. The information-recording apparatus according to claim 1, wherein said control unit is further configured to update file-system information and control said recording unit to record said updated file-system information in said second region of gathered files without updating or recording any one of the group units, when a file not having attribute information associated with any of the group units is added.

11. The information-recording apparatus according to claim 1, wherein said control unit is further configured to update file-system information on said recording medium to place group file area regions of the first region of gathered files which were updated into an unreferenced state, when a file having attribute information associated with one of the group units is added or updated.

* * * * *